United States Patent
Li et al.

(10) Patent No.: US 11,909,105 B2
(45) Date of Patent: Feb. 20, 2024

(54) ANTENNA FOR IMPROVING INFLUENCE OF SURFACE WAVES AND INCREASING BEAMWIDTH

(71) Applicant: ARCADYAN TECHNOLOGY CORPORATION, Hsinchu (TW)

(72) Inventors: Guan-Yi Li, Hsinchu (TW); Shin-Lung Kuo, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 882 days.

(21) Appl. No.: 16/920,875

(22) Filed: Jul. 6, 2020

(65) Prior Publication Data

US 2021/0210842 A1   Jul. 8, 2021

(30) Foreign Application Priority Data

Jan. 6, 2020 (TW) ................................ 109100380

(51) Int. Cl.
| | |
|---|---|
| *H01Q 1/32* | (2006.01) |
| *G01S 7/03* | (2006.01) |
| *H01Q 1/38* | (2006.01) |
| *H01Q 1/48* | (2006.01) |
| *G01S 13/32* | (2006.01) |
| *G01S 13/58* | (2006.01) |

(52) U.S. Cl.
CPC ............. *H01Q 1/3233* (2013.01); *G01S 7/03* (2013.01); *H01Q 1/38* (2013.01); *H01Q 1/48* (2013.01); *G01S 13/32* (2013.01); *G01S 13/58* (2013.01)

(58) Field of Classification Search
None
See application file for complete search history.

(56) References Cited

U.S. PATENT DOCUMENTS

2014/0203960 A1\*   7/2014   Huang .................... G01S 7/034
                                                              342/175

\* cited by examiner

*Primary Examiner* — Whitney Moore
(74) *Attorney, Agent, or Firm* — Lin & Associates Intellectual Property, Inc.

(57) ABSTRACT

An antenna for improving an influence of surface waves and increasing a beamwidth includes: a substrate, a first metal ground, a second metal ground, an emitting end and a receiving module. The first metal ground and the second metal ground are disposed on a first surface of the substrate. The second metal ground is completely separated from the first metal ground by a first gap. The emitting end is disposed on the first metal ground and includes a transmission line and a plurality of radiating elements. The receiving module is disposed on the second metal ground and includes a first receiving end and a second receiving end. The first receiving end includes a transmission line and a plurality of radiating elements. The second receiving end includes a transmission line and a plurality of radiating elements.

17 Claims, 16 Drawing Sheets

ANTENNA FOR IMPROVING INFLUENCE OF SURFACE WAVES AND INCREASING BEAMWIDTH

CROSS-REFERENCE TO RELATED APPLICATION

This application claims the priority of Taiwanese patent application No. 109100380, filed on Jan. 6, 2020, which is incorporated herewith by reference.

BACKGROUND OF THE INVENTION

1. Field of the Invention

The present invention relates to an antenna, in particular to an antenna for improving an influence of surface waves and increasing a beamwidth.

2. The Prior Arts

Vehicles are equipped with blind spot detection, lane switching assistance, automatic vehicle distance control cruise, parking assistance, automatic braking, collision warning, lane departure detection and other systems to improve driving safety. The above systems are usually installed with a vehicle radar. The vehicle radar can accurately and reliably detect and locate surrounding objects in any environment. The vehicle radar includes an antenna for detecting the distance and speed of the object generally by the principle of frequency modulated continuous wave (FMCW), the operating frequency of which may be 24 GHz or 77 GHz or 79 GHz for supporting the frequency band of the vehicle radar.

Please refer to FIG. 1, which is a top view of a first conventional antenna 100. The first conventional antenna 100 includes a substrate (not shown), a metal ground 110, and two emitting ends 120, 130 and two receiving modules 140, 150. The metal ground 110 is disposed on a first surface of the substrate. The two emitting ends 120, 130 adjacent to each other are disposed on the metal ground 110. The emitting ends 120, 130 include transmission lines 121, 131 and multiple radiating elements 122, 132, respectively. The transmission lines 121, 131 of the emitting end 120, 130 extend along a Y-axis direction. The radiating elements 122, 132 of the emitting ends 120, 130 are in a block shape and arranged on the transmission lines 121 and 131 of the emitting ends 120, 130 along the Y-axis direction. The receiving modules 140, 150 respectively include first receiving ends 141, 151 and second receiving ends 142, 152. The first receiving ends 141, 151 are disposed on the metal ground 110 and respectively include transmission lines 1411, 1511 and a plurality of radiating elements 1412, 1512. The transmission lines 1411, 1511 of the first receiving ends 141, 151 extend along a Y-axis direction. The radiating elements 1412, 1512 of the first receiving ends 141, 151 respectively are in a block shape, and are arranged on the transmission lines 1411, 1511 of the first receiving ends 141, 151 along the Y-axis direction. The second receiving ends 142, 152 are disposed on the metal ground 110 and respectively include the transmission lines 1421, 1521 and a plurality of radiating elements 1422, 1522. The transmission lines 1421, 1521 of the second receiving ends 142, 152 respectively extend along a Y-axis direction. The radiating elements 1422, 1522 of the second receiving ends 142, 152 respectively are in a block shape, and are respectively arranged on the transmission lines 1421, 1521 of the second receiving ends 142, 152 along the Y-axis direction. The locations of the radiating elements 1412, 1512 of the first receiving ends 141, 151 of the two receiving modules 140, 150 and the locations of the radiating elements 1422, 1522 of the second receiving ends 142, 152 of the two receiving modules 140, 150 are aligned with each other.

When the first conventional antenna 100 is installed on a sensor (e.g. vehicle radar (not shown)), the radiating elements 122, 132 of the emitting ends 120, 130 respectively emit an electromagnetic wave toward the front of the sensor and upper side, lower side, left side, and right side surrounding the sensor. After the electromagnetic wave reaches the object and is reflected, the radiating elements 1412, 1422, 1512, 1522 of the first receiving ends 141, 151 and second receiving ends 142, 152 respectively receive the reflected electromagnetic wave. The receiving modules 140, 150 generates a phase difference by using the physical characteristics of half wavelength between the first receiving ends 141, 151 and the second receiving ends 142, 152 separated from each other. The phase difference can be used to determine the direction of the distant object reflecting the electromagnetic wave.

Because the polarization direction (i.e., the current direction) of the first conventional antenna 100 is only in the Y-axis direction without the X-axis direction, only the radiation field on the YZ plane consisting of the Y-axis direction and the Z-axis direction is generated, but the radiation field on the XZ plane consisting of the X-axis direction and the Z-axis direction is not generated. Thus, the electromagnetic waves of the two emitting ends 120, 130 and the two receiving modules 140, 150 will not interfere with each other through the transmission of the metal ground 110, the jitter of the radiation field is not obvious, and thus the electromagnetic waves are stable without sudden variation. However, the positive gain range of the two emitting ends 120, 130 of the first conventional antenna 100 and the two receiving modules 140, 150 of the first conventional antenna 100 is smaller, which represents that the detection range of the sensor installed with the first conventional antenna 100 is smaller.

Please refer to FIG. 2, which is a top view of a second conventional antenna 200. The difference between the second conventional antenna 200 and the first conventional antenna 100 is that all radiating elements 222, 232, 2412, 2422, 2512, and 2522 are in a strip shape, so that the two emitting ends 220, 230, the first receiving ends 241, 251 and the second receiving ends 242, 252 of the two receiving modules 240, 250 of the second conventional antenna 200 are comb-shaped. Therefore, the polarization direction (i.e., the current direction) of the second conventional antenna 200 has both the X-axis direction component and the Y-axis direction component, so radiation fields on the XZ plane consisting of the X-axis direction and the Z-axis direction and on the YZ plane consisting of the Y-axis direction and the Z-axis direction are generated. The positive gains of the two emitting ends 220, 230, the first receiving ends 241, 251 and the second receiving ends 242, 252 of the two receiving modules 240, 250 of the second conventional antenna 200 are greater than those of the two emitting ends 120, 130, the first receiving ends 141, 151 and the second receiving ends 142, 152 of the two receiving modules 140, 150 of the first conventional antenna 100, which means that the detection range of the sensor equipped with the second conventional antenna 200 is larger than that of the sensor equipped with the first conventional antenna 100.

Please refer to FIG. 3, which is a schematic diagram of the electric field distribution of the second conventional antenna 200. Because the electromagnetic waves of the two emitting ends 220, 230, the first receiving ends 241, 251 and the second receiving ends 242, 252 of the two receiving modules 240, 250 of the second conventional antenna 200 will be transmitted along the X-axis direction through a large area of the metal ground 210, and the polarization direction of the second conventional antenna 200 is parallel to the extension direction of the metal ground 210. A radiation field on the XZ plane composed of the X-axis direction and the Z-axis direction will be generated, thereby resulting in the electromagnetic interference between the two emitting ends 220, 230, the first receiving ends 241, 251 and the second receiving ends 242, 252 of the two receiving modules 240, 250, and the electromagnetic interference between the two emitting ends 220, 230. In such a way, the jitter of the radiation field of the second conventional antenna 200 on the XZ plane is quite obvious, and the electromagnetic waves will be unstably large and small.

Because the phase difference changes are positively relevant with the radiation field, the jitter of the radiation field on the XZ plane relates to the jitter of the phase difference, which represents the accuracy of determining the direction of the object. If the jitter of the phase difference is large, the direction of the object is difficult to be accurately determined. Relatively, the jitter of the phase difference is small, even approaching to a linear line, which represents that it is easier to accurately determine the direction of the object.

Please refer to FIG. 4, which is a schematic diagram of the phase difference between the two receiving modules 240, 250 of the second conventional antenna 200. The phase difference between the two receiving modules 240, 250 of the second conventional antenna 200 includes a plurality of obvious jitters within directional angles ranging from negative 15 degrees to positive 60 degrees, which represents that the phase difference will correspond to more than one directional angle, that is, objects in different directions. Therefore, the second conventional antenna 200 is difficult to accurately determine the direction of the object.

Furthermore, the locations of the radiating elements 2412, 2512 on the first sides 2413, 2513 of the transmission lines 2411, 2511 of the first receiving ends 241, 251 of the two receiving modules 240, 250 align with the locations of the radiating elements 2422, 2522 on the first sides 2423, 2523 of the transmission lines 2421, 2521 of the second receiving ends 242, 252 of the two receiving modules 240, 250; and the locations of the radiating elements 2412, 2512 on the second sides 2414, 2514 of the transmission lines 2411, 2511 of the first receiving ends 241, 251 of the two receiving modules 240, 250 align with the locations of the radiating elements 2422, 2522 on the second sides 2424, 2524 of the transmission lines 2421, 2521 of the second receiving ends 242, 252 of the two receiving modules 240, 250. In other words, the radiating elements at two adjacent receiving ends are very close to each other, intense coupling effect will be generated therebetween, thereby resulting in an asymmetric and unstable radiation field, and also the asymmetric and unstable phase difference, which make it more difficult to accurately determine the direction of the object.

In addition, as shown in FIG. 1, the four sides of the metal ground 110 of the first conventional antenna 100 are aligned with the four sides of the substrate. As shown in FIG. 2, it is shown that the four sides of the metal ground 210 of the second conventional antenna 200 are aligned with the four sides of the substrate. The first conventional antenna 100 or the second conventional antenna 200 is disposed in a sensor (for example, a vehicle radar), many electronic components in the surrounding environment may contact the sides of the substrate and the metal grounds 110, 210 of the first conventional antenna 100 or the second conventional antenna 200. Therefore, the electromagnetic waves of these electronic components enter the metal grounds 110, 210 of the first conventional antenna 100 or the second conventional antenna 200, and the electromagnetic waves of the two emitting ends 120, 130 and the two receiving modules 140, 150 of the first conventional antenna 100 or the electromagnetic waves of the two emitting ends 220, 230 and the two receiving modules 240, 250 of the second conventional antenna 200 will also be transmitted to these electronic components through the metal grounds 110, 210. Therefore, the electromagnetic waves of the two emitting ends 120, 130 and the two receiving modules 140, 150 of the first conventional antenna 100 or the two emitting ends 220, 230 and the two receiving modules 240, 250 of the second conventional antenna 200 interfere with the electromagnetic waves of the electronic components. This phenomenon is called edge effect.

SUMMARY OF THE INVENTION

A main objective of the present invention is to provide an antenna for improving an influence of surface waves and increasing a beamwidth to solve mutual interference of electromagnetic waves between the emitting end and the receiving module, and achieve the purpose of improving the influence of surface waves, thereby improving the accuracy in determining the direction of an object by the antenna of the present invention.

Another objective of the present invention is to provide an antenna for improving an influence of surface waves and increasing a beamwidth to solve mutual interference of electromagnetic waves between the emitting ends and achieve the purpose of improving the influence of surface waves, thereby improving the accuracy in determining the direction of an object by the antenna of the present invention.

A yet another objective of the present invention is to provide an antenna for improving an influence of surface waves and increasing a beamwidth to generate radiation fields on the XZ plane and the YZ plane and increase the beamwidth and further increase the detection range of the antenna of the present invention.

A further objective of the present invention is to provide an antenna for improving an influence of surface waves and increasing a beamwidth, reducing the coupling effect of the radiating elements at the adjacent two receiving ends, improving the isolation between the adjacent two receiving ends, and making the radiation field and phase difference symmetrical and stable.

Another further objective of the present invention is to provide an antenna for improving an influence of surface waves and increasing a beamwidth, wherein no electromagnetic wave interference is generated between the electronic elements and the emitting ends and the receiving modules, and thus an edge effect is prevented.

To achieve the objectives mentioned above, the present invention provides an antenna for improving an influence of surface waves and increasing a beamwidth, including: a substrate, a first metal ground, a second metal ground, an emitting end and a receiving module.

The substrate has two surfaces along a Z-axis direction, which are defined as a first surface and a second surface, respectively, the substrate has two sides along an Y-axis direction, which are defined as a first side and a second side, respectively, and the substrate has two sides along an X-axis direction, which are defined as a third side and a fourth side, respectively.

The first metal ground is disposed on the first surface of the substrate.

The second metal ground is disposed on the first surface of the substrate, and located on a side of the first metal ground along the X-axis direction. The second metal ground is completely separated from the first metal ground by a first gap.

The emitting end is disposed on the first metal ground, and includes a transmission line and a plurality of radiating elements, wherein the transmission line of the emitting end extends along the Y-axis direction, the radiating elements of the emitting end are in a strip shape and disposed at intervals on a first side and a second side of the transmission line of the emitting end along the Y-axis direction.

The receiving module is disposed on the second metal ground and includes a first receiving end and a second receiving end, wherein the first receiving end includes a transmission line and a plurality of radiating elements, and the transmission line of the first receiving end extends along the Y-axis direction, the radiating elements of the first receiving end are in a strip shape and disposed at intervals on a first side and a second side of the transmission line of the first receiving end along the Y-axis direction, and the second receiving end is located on a side of the first receiving end along the X-axis direction, the second receiving end includes a transmission line and a plurality of radiating elements, the transmission line of the second receiving end extends along the Y-axis direction, the radiating elements of the second receiving end are in a strip shape and disposed at intervals on a first side and a second side of the transmission line of the second receiving end along the Y-axis direction.

Preferably, the antenna further includes a plurality of first metal grounds and a plurality of emitting ends, wherein adjacent two first metal grounds are completely separated by a second gap, and the emitting ends are respectively disposed on the first metal grounds.

Preferably, a width of the second gap is larger than or equal to 1 mm.

Preferably, locations of the radiating elements on the first side of the transmission line of the first receiving end are interleaved with locations of the radiating elements on the first side of the transmission line of the second receiving end, locations of the radiating elements on the second side of the transmission line of the first receiving end are interleaved with locations of the radiating elements on the second side of the transmission line of the second receiving end.

Preferably, the antenna includes a plurality of receiving modules, the locations of the radiating elements on the first side of the transmission line of the first receiving end of the receiving modules are aligned with each other, the locations of the radiating elements on the second side of the transmission line of the first receiving end of the receiving modules are aligned with each other, the locations of the radiating elements on the first side of the transmission line of the second receiving end of the receiving modules are aligned with each other, and the locations of the radiating elements on the second side of the transmission line of the second receiving end of the receiving modules are aligned with each other.

Preferably, the locations of the radiating elements on the first side of the transmission line of the first receiving end are aligned with the locations of the radiating elements on the first side of the transmission line of the second receiving end; and wherein the locations of the radiating elements on the second side of the transmission line of the first receiving end are aligned with the locations of the radiating elements on the second side of the transmission line of the second receiving end.

Preferably, the antenna includes a plurality of receiving modules, wherein the locations of the radiating elements on the first side of the transmission line of the first receiving end of the receiving modules are aligned with the locations of the radiating elements on the first side of the transmission line of the second receiving end of the receiving modules, and the locations of the radiating elements on the second side of the transmission line of the first receiving end of the receiving modules are aligned with locations of the radiating elements on the second side of the transmission line of the second receiving end of the receiving modules.

Preferably, a width of the first gap is larger than or equal to 1 mm.

Preferably, the first metal ground is completely separated from the third side of the substrate by a third gap.

Preferably, the second metal ground is completely separated from the fourth side of the substrate by a fourth gap.

The present invention has the advantageous effects that in the antenna of the present invention, the second metal ground is completely separated from the first metal ground by a first gap, which effectively decreases the electromagnetic wave across the first gap to solve mutual interference of the electromagnetic waves between the emitting end and the receiving module, and achieve the purpose of improving the influence of surface waves, thereby improving the accuracy in determining the direction of an object by the antenna of the present invention.

Secondly, in the antenna of the present invention, the adjacent two first metal grounds are completely separated by a second gap, which effectively decreases the electromagnetic wave across the second gap to solve mutual interference of electromagnetic waves between the emitting ends, and achieve the purpose of improving the influence of surface waves, thereby improving the accuracy in determining the direction of an object by the antenna of the present invention.

Furthermore, the polarization direction (i.e., the current direction) of the antenna of the present invention has both the X-axis direction component and the Y-axis direction component, so the radiation fields on the XZ plane and the YZ plane are generated, the beamwidth (i.e., the positive gain range) may be increased and the detection range of the antenna of the present invention is further increased.

Besides, the antenna of the present invention can reduce the coupling effect of the radiating elements at the adjacent two receiving ends, improve the isolation between the adjacent two receiving ends, and make the radiation field pattern and phase difference symmetrical and stable.

Moreover, the antenna of the present invention may make no electromagnetic wave interference between the electronic elements and the emitting ends and the receiving modules, and thus the edge effect is prevented.

DETAILED DESCRIPTION OF THE PREFERRED EMBODIMENT

Figure 1:
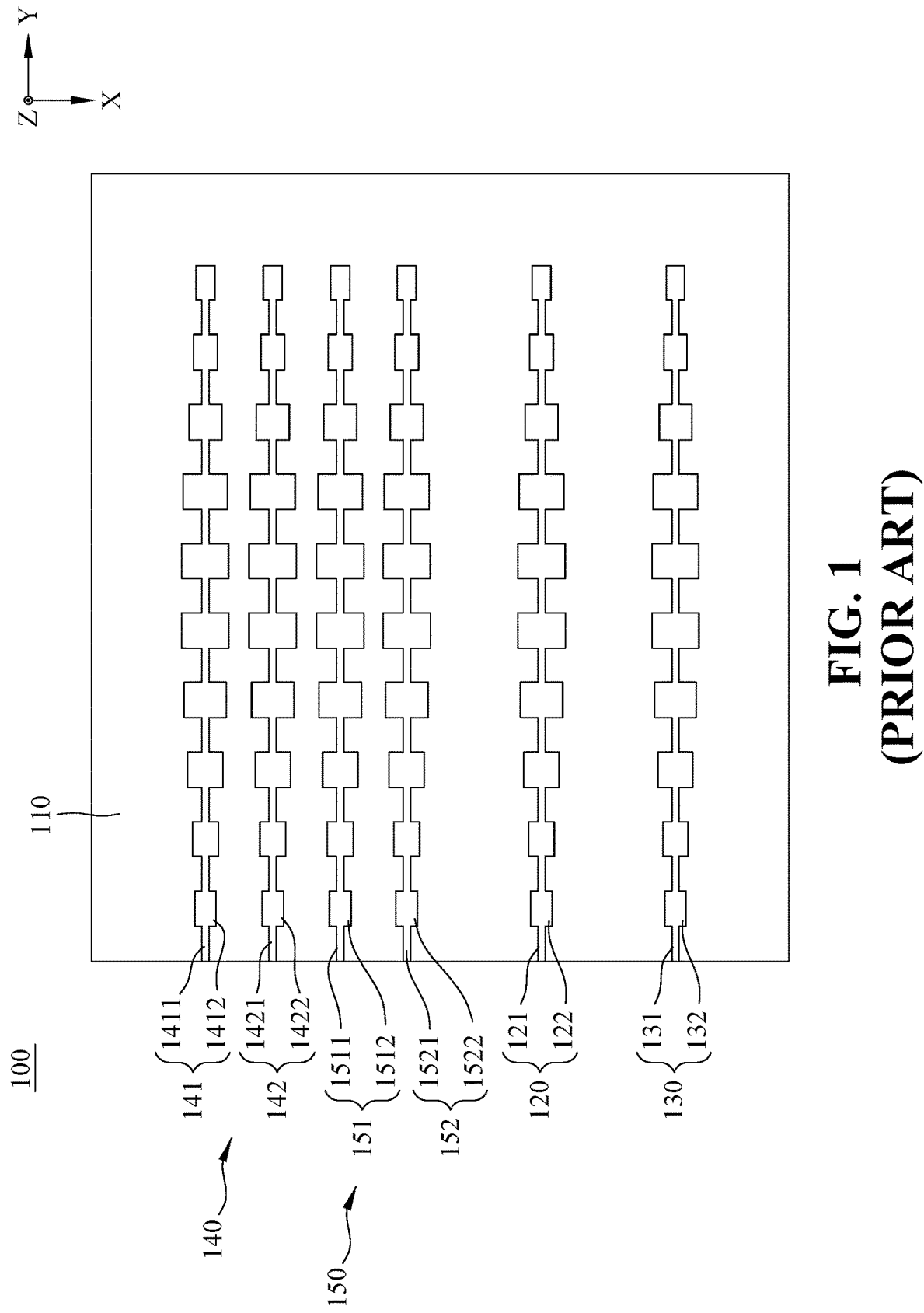
FIG. 1 is a top view of a first conventional antenna.
Figure 2:
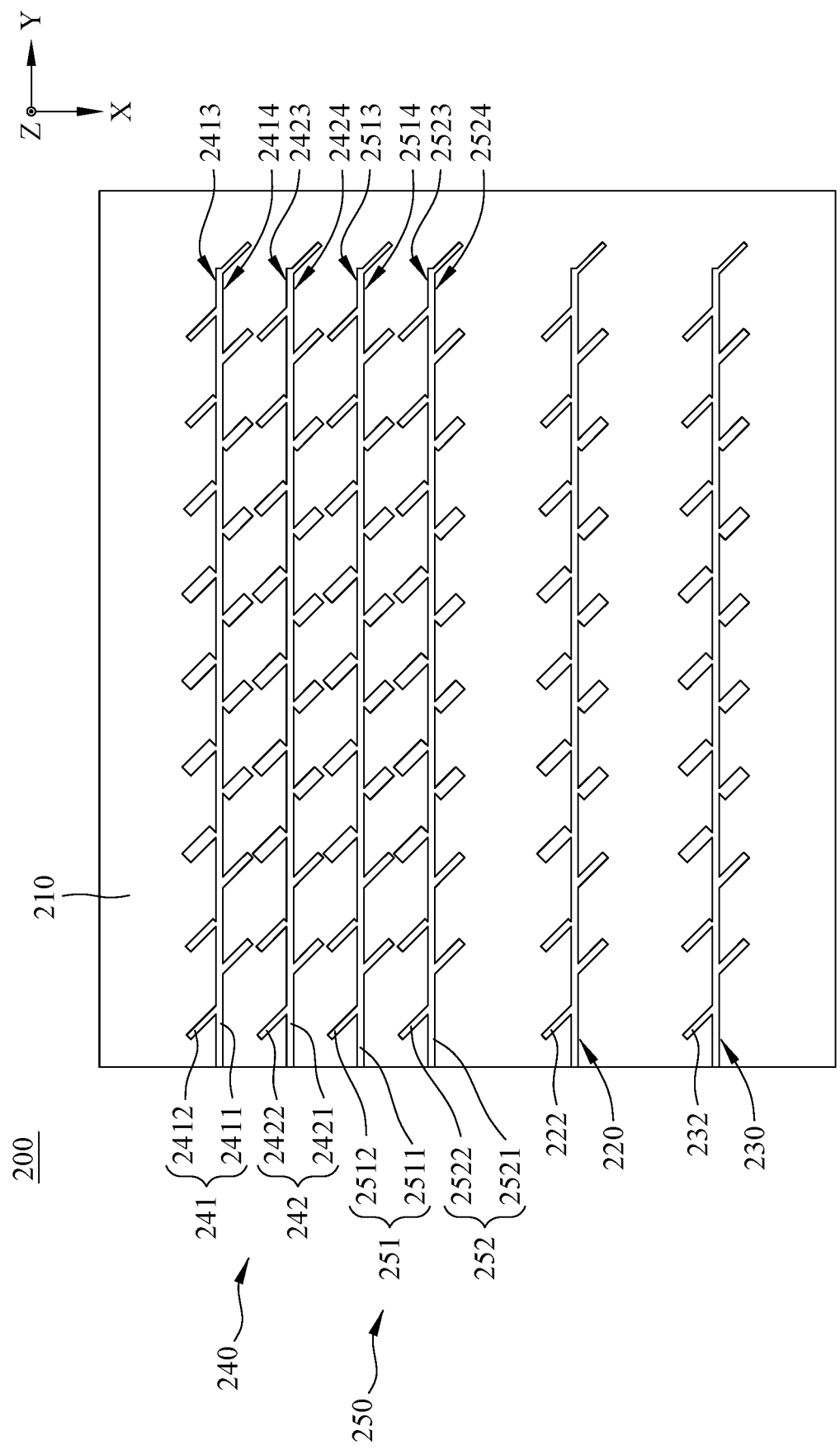
FIG. 2 is a top view of a second conventional antenna.
Figure 3:
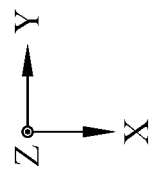
FIG. 3 is a schematic diagram of the electric field distribution of the second conventional antenna.
Figure 3:
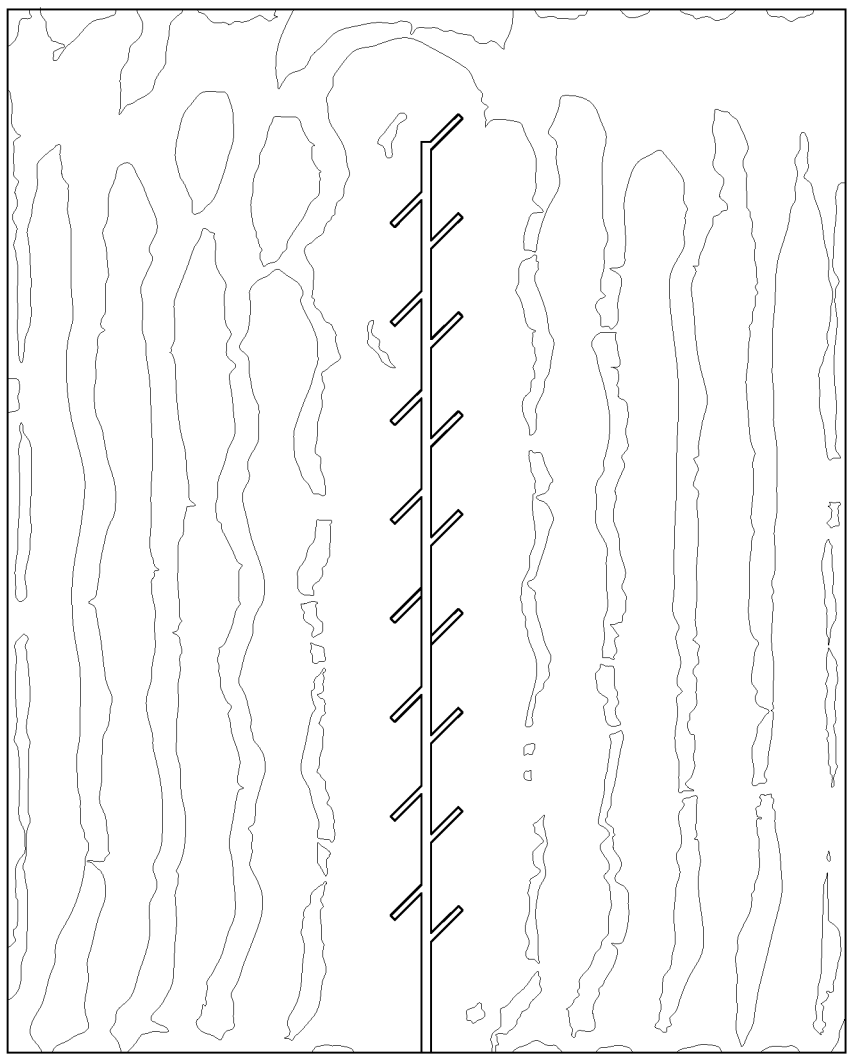
Figure 4:
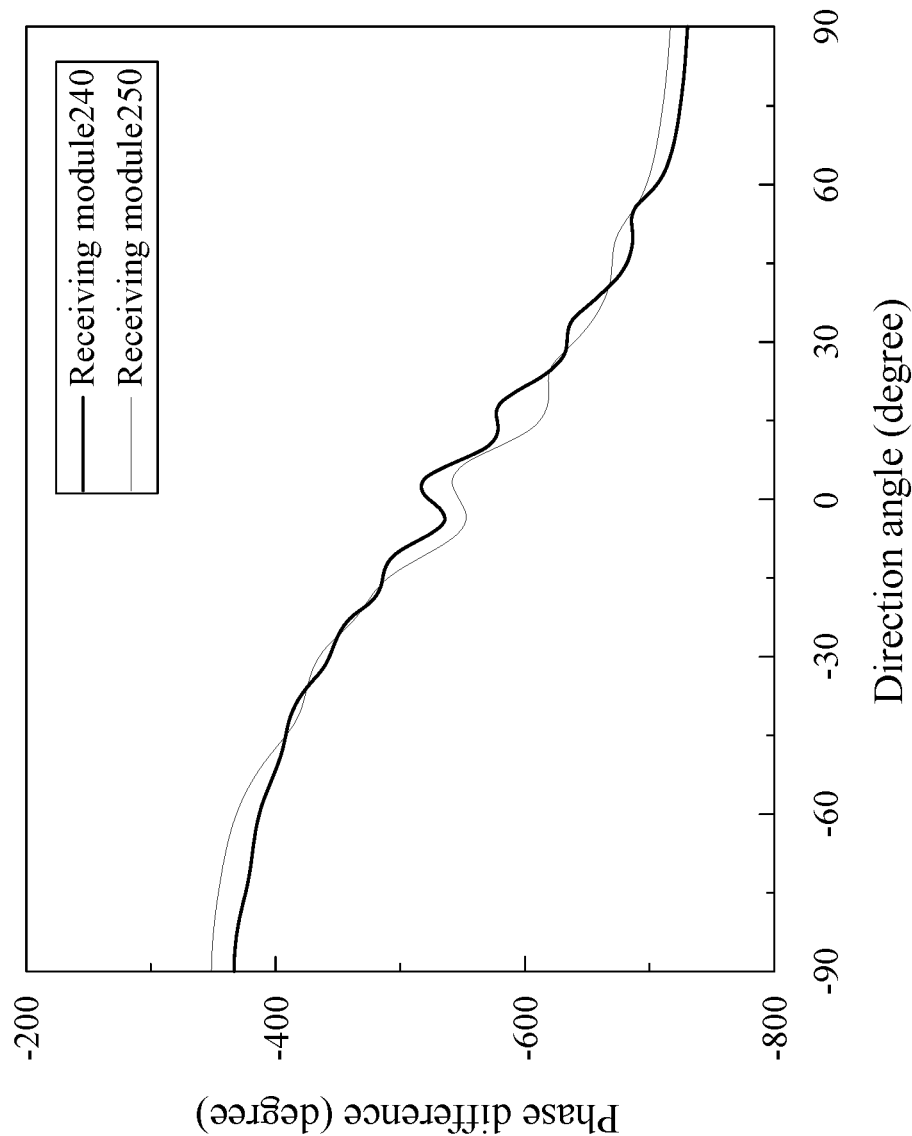
FIG. 4 is a schematic diagram of the phase difference between the two receiving modules of the second conventional antenna.

More details of the embodiments of the present invention with drawings and element symbols are described in the following, so that those skilled in the art can implement them after studying this specification.

Please refer to FIGS. 5A and 6-9, which respectively are perspective view, front view, left side view, top view, and right side view of the first embodiment of the present invention. The present invention provides an antenna 1 for improving an influence of surface waves and increasing a beamwidth. The antenna 1 includes: a substrate 10, a first metal ground 20, a second metal ground 30, an emitting end 40 and a receiving module 50.

The substrate 10 has two surfaces along a Z-axis direction, which are defined as a first surface 101 and a second surface 102, respectively. The substrate 10 has two sides along a Y-axis direction, which are defined as a first side 11 and a second side 12, respectively. The substrate 10 has two sides along an X-axis direction, which are defined as a third side 13 and a fourth side 14. More specifically, when the antenna 1 of the present invention is mounted on a sensor (not shown), the first surface 101 and the second surface 102 of the substrate 10 respectively face the front and back surfaces of the sensor. The first side 11 and the second side 12 of the substrate 10 respectively face the left side and right side of the sensor, and the third side 13 and the fourth side 14 of the substrate 10 respectively face the top and bottom ends of the sensor. Preferably, the substrate 10 is an insulating conductive layer, the material of which is RO4835, with the dielectric constant being 3.66 and the loss factor being 0.0037. However, the material of the substrate 10 is not limited thereto, and any material suitable for the substrate of the antenna may be applied in the present invention. Regarding the size of the substrate 10, the thickness thereof is 4 mil (mil is one-thousandth of an inch), the length thereof is 24.1 mm, and the width thereof is 20.25 mm. However, since the size of the substrate 10 depends on the operating frequency, the size of the substrate 10 can be slightly adjusted according to the operating frequency.

The first metal ground 20 is disposed on the first surface 101 of the substrate 10. The material of the first metal ground 20 may be copper or other conductor suitable for the metal ground of the antenna.

The second metal ground 30 is disposed on the first surface 101 of the substrate 10 and is located on one side of the first metal ground 20 in the X-axis direction. The second metal ground 30 and the first metal ground 20 are completely separated by a first gap 61. The material of the second metal ground 30 may be copper or other conductor suitable to be the metal ground of the antenna.

The emitting end 40 is disposed on the first metal ground 20, and includes a transmission line 41 and a plurality of radiating elements 42. The transmission line 41 of the emitting end 40 extends along the Y-axis direction. The radiating elements 42 of the emitting end 40 are in a strip shape, and disposed at intervals on a first side 411 and a second side 412 of the transmission line 41 of the emitting end 40 in the Y-axis direction. More specifically, the radiating elements 42 located on the first side 411 of the transmission line 41 of the emitting end 40 are parallel to each other, the radiating elements 42 located on the second side 412 of the transmission line 41 of the emitting end 40 are parallel to each other, and the distance between two adjacent radiating elements 42 on different sides is half wavelength. The radiating elements 42 of the emitting end 40 all are inclined with respect to the transmission line 41 of the emitting end 40, so as to form an included angle with the transmission line 41 of the emitting end 40. Preferably, the included angle is 45 degrees. Therefore, the overall appearance of the emitting end 40 is in a comb shape. Because the radiating elements 42 form 45 degrees, the radiating elements 42 have polarization fields in the X-axis and Y-axis directions, that is, the radiant energies of the primary polarization and the secondary polarization are equivalent to each other. Preferably, there are totally nine radiating elements 42 located on the first side 411 of the transmission line 41 of the emitting end 40, nine radiating elements 42 located on the second side 412 of the transmission line 41 of the emitting end 40. However, the present invention is not limited thereto. The actual number of the radiating elements 42 of the emitting end 40 can be appropriately increased or decreased according to the actual requirements. In addition, at closer to the two ends of the transmission line 41 of the emitting end 40, the width of the radiating element 42 is smaller; on the contrary, at closer to the middle of the transmission line 41 of the emitting end 40, the width of the radiating element 42 is larger.

The receiving module 50 is disposed on the second metal ground 30, and includes a first receiving end 51 and a second receiving end 52.

The first receiving end 51 includes a transmission line 511 and a plurality of radiating elements 512. The transmission line 511 of the first receiving end 51 extends along the Y-axis direction. The radiating elements 512 of the first receiving end 51 are in a strip shape, spaced apart from each other and disposed on a first side 5111 and a second side 5112 of the transmission line 511 of the first receiving end 51 along the Y-axis direction. More specifically, the radiating elements 512 located on the first side 5111 of the transmission line 511 of the first receiving end 51 are parallel to each other, and the radiating elements 512 located on the second side 5112 of the transmission line 511 of the first receiving end 51 are parallel to each other. The distance between two adjacent radiating elements 512 on different sides is half wavelength. The radiating elements 512 of a receiving end 51 are all inclined with respect to the transmission line 511 of the first receiving end 51, so as to form an included angle with the transmission line 511 of the first receiving end 51. Preferably, the included angle is 45 degrees. Therefore, the overall appearance of the first receiving end 51 is in a comb shape. Because the radiating element 512 is 45 degrees, the radiating element 512 has polarization fields in the X-axis and Y-axis directions, that is, the radiation energies of the primary polarization and the secondary polarization are equivalent to each other. Preferably, there are totally nine radiating elements 512 located on the first side 5111 of the transmission line 511 of the first receiving end 51, nine radiating elements 512 located on the second side 5112 of the transmission line 511 of the first receiving end 51. However, the present invention is not limited thereto. The actual number of the radiating elements 512 of the first receiving end 51 can be appropriately increased or decreased according to the actual requirements. In addition, at closer to the two ends of the transmission line 511 of the first receiving end 51, the width of the radiating element 512 is smaller; on the contrary, at closer to the middle of the transmission line 511 of the first receiving end 51, the width of the radiating element 512 is larger.

The second receiving end 52 is disposed on a side of the first receiving end 51 in the X-axis direction. The second receiving end 52 includes a transmission line 521 and a plurality of radiating elements 522. The transmission line 521 of the second receiving end 52 extends along the Y-axis direction. The radiating elements 522 of the second receiving end 52 are in a strip shape, and disposed on a first side 5211 and a second side 5212 of the transmission line 521 of the second receiving end 52 in the Y-axis direction. More specifically, the radiating elements 522 located on the first side 5211 of the transmission line 521 of the second receiving end 52 are parallel to each other, the radiating elements 522 located on the second side 5212 of the transmission line 521 of the second receiving end 52 are parallel to each other, and the distance between two adjacent radiating elements 522 on different sides is half wavelength. The radiating elements 522 of the second receiving end 52 are all inclined with respect to the transmission line 521 of the second receiving end 52, so as to form an included angle with the transmission line 521 of the second receiving end 52. Preferably, the included angle is 45 degrees. Therefore, the overall appearance of the second receiving end 52 is in a comb shape. Because the radiating element 522 forms 45 degrees, the radiating element 522 has polarization fields in the X-axis and Y-axis directions; that is, the radiant energies of the primary polarization and the secondary polarization are equivalent to each other. Preferably, there are totally nine radiating elements 522 located on the first side 5211 of the transmission line 521 of the second receiving end 52, and nine radiating elements 522 located on the second side 5212 of the transmission line 521 of the second receiving end 52. However, the present invention is not limited thereto. The actual number of the radiating elements 522 of the second receiving end 52 can be appropriately increased or decreased according to the actual requirements. In addition, at closer to the two ends of the transmission line 521 of the second receiving end 52, the width of the radiating elements 522 is smaller; on the contrary, at closer to the middle of the transmission line 521 of the second receiving end 52, the width of the radiating elements 522 is larger.

The radiating elements 42 of the emitting ends 40 emit an electromagnetic wave toward the front of the sensor, and the upper side, lower side, left side, and right side surrounding the sensor. After the electromagnetic wave reaches the object and is reflected, the radiating elements 512 of the first receiving end 51 and the radiating elements 512 of the second receiving ends 52 receive the reflected electromagnetic wave. The receiving modules 50 generates a phase difference by using the physical characteristics of half wavelength between the first receiving end 51 and the second receiving end 52 separated from each other. The phase difference can be used to determine the direction of the distant object reflecting the electromagnetic wave.

Figure 10:
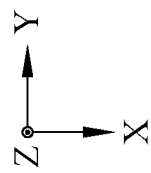
FIG. 10 is an electric field distribution diagram at an emitting end of the first embodiment of the present invention.
Figure 10:
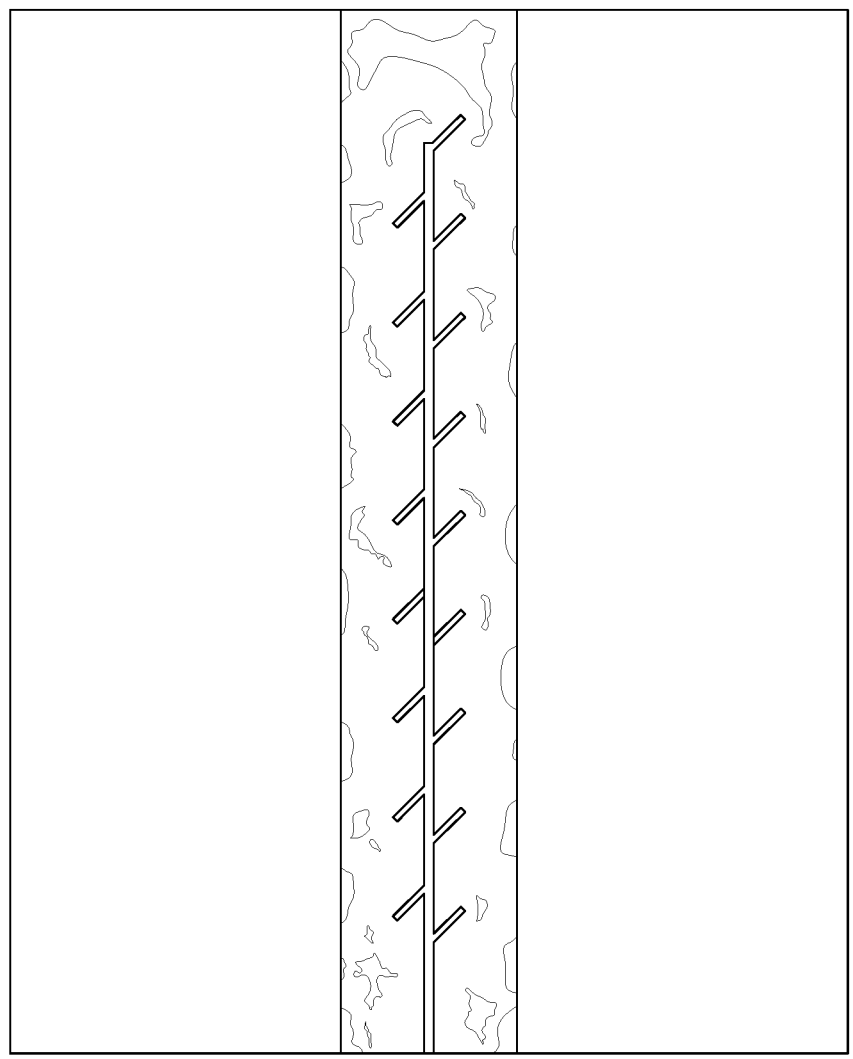

Please refer to FIG. 10, which is an electric field distribution diagram of the emitting end 40 of the first embodiment of the present invention. Because the second metal ground 30 and the first metal ground 20 of the antenna 1 of the present invention are completely separated by the first gap 61, the electromagnetic waves at the emitting end 40 are confined to the first metal ground 20, and the electromagnetic waves of the receiving module 50 are confined to the second metal ground 30, which effectively reduces the electromagnetic waves across the first gap 61, and solves the problem that the electromagnetic waves between the emitting end 40 and the receiving module 50 interfere with each other and thus achieves the purpose of improving the influence of surface waves, thereby improving the accuracy of the antenna 1 of the present invention in determining the direction of the object.

Figure 5A:
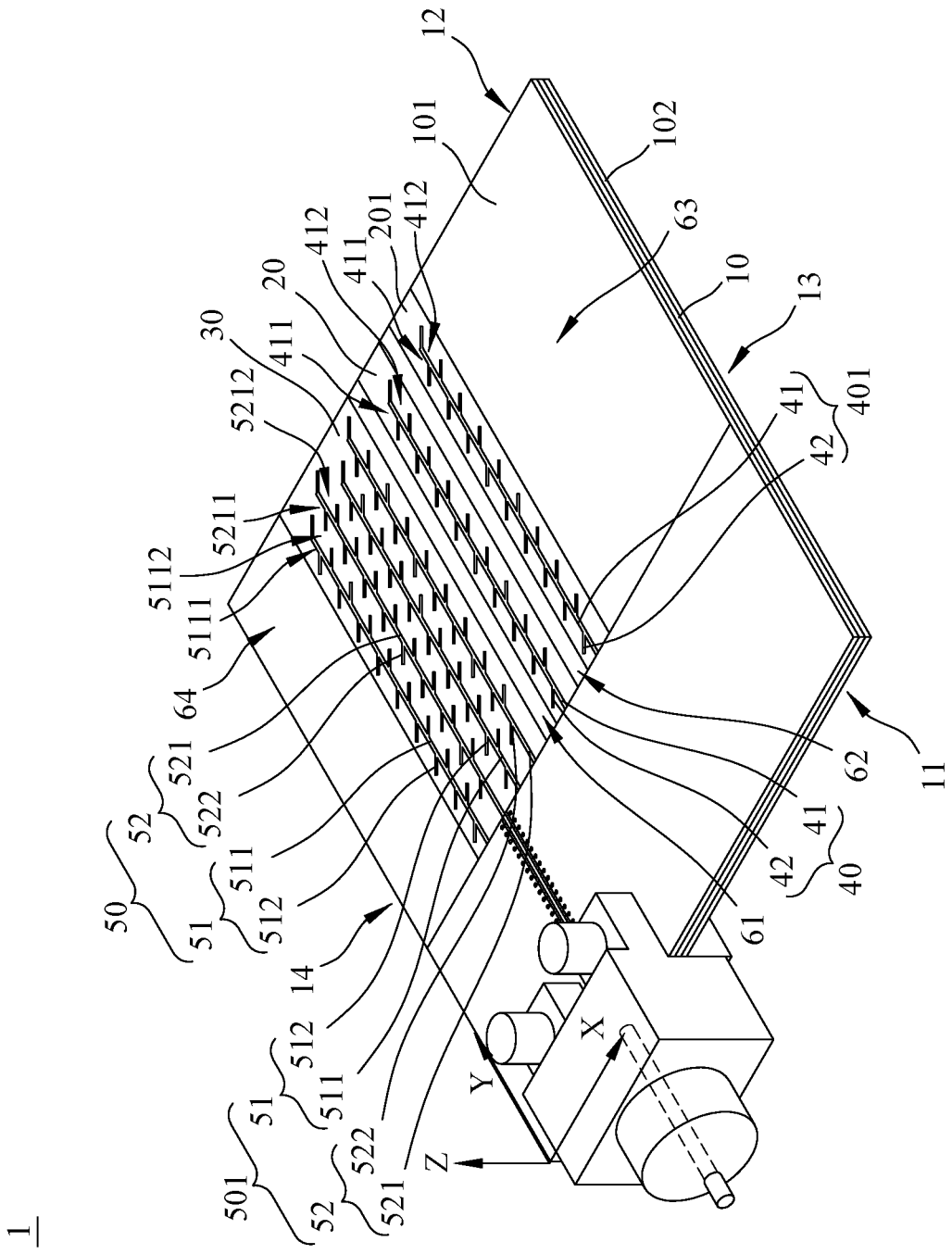
FIG. 5A is a perspective view of a first embodiment of the present invention.
Figure 5B:
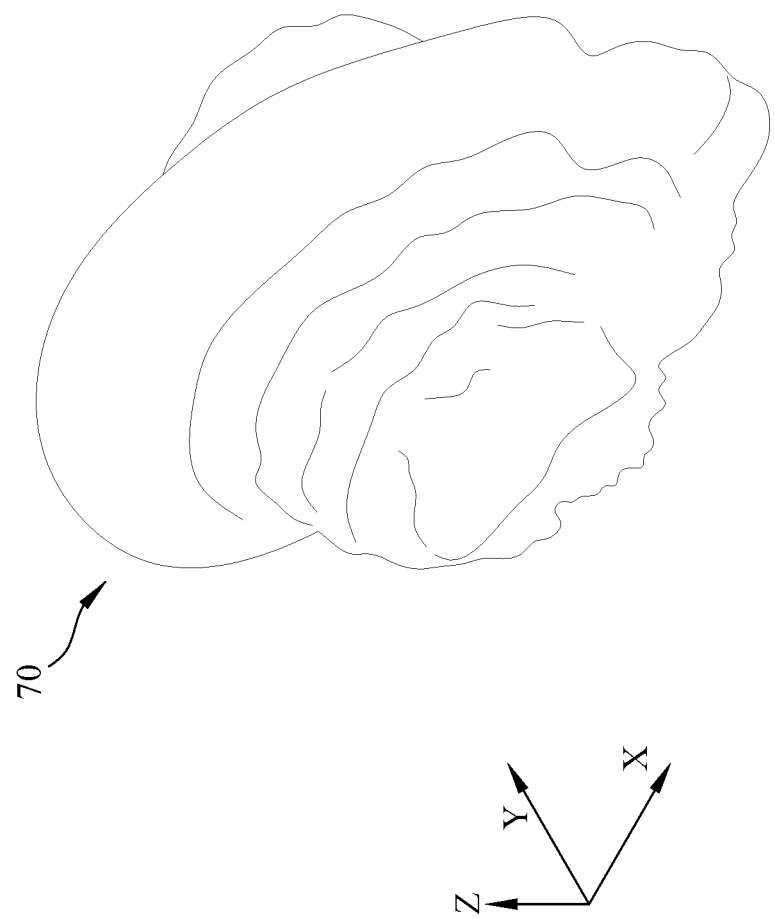
FIG. 5B shows a schematic diagram of a radiation field range of the antenna of the present invention.
Figure 6:
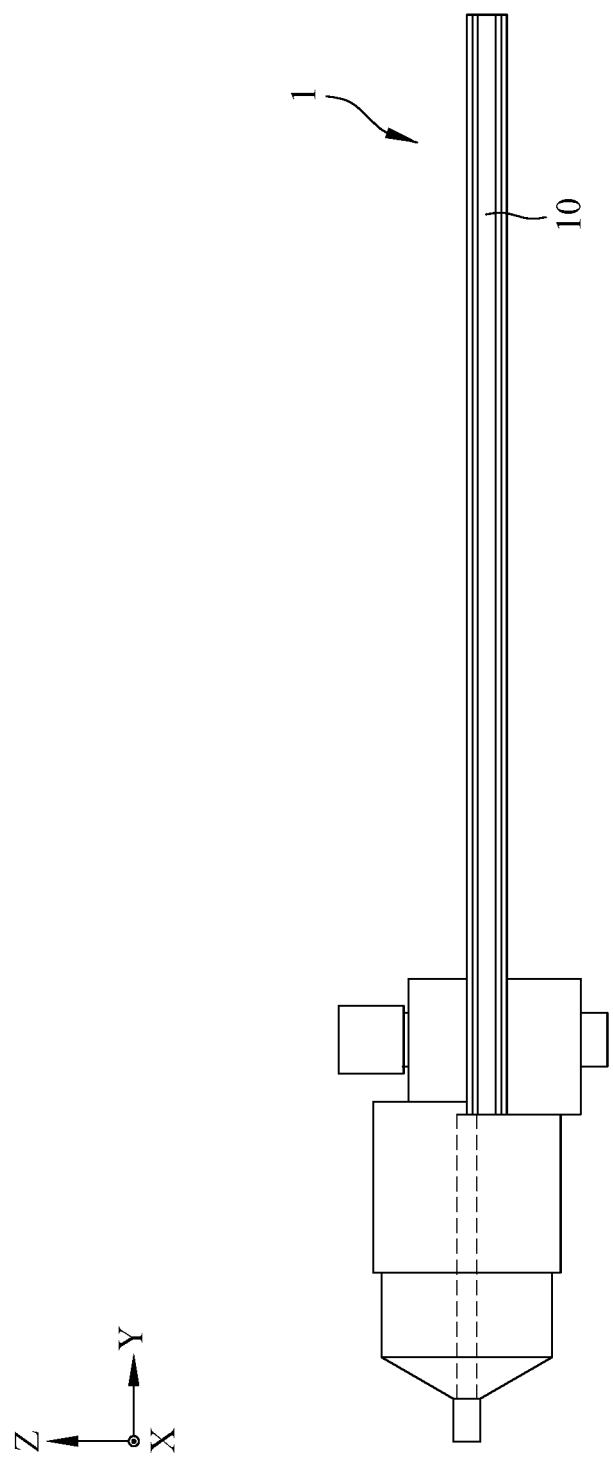
FIG. 6 is a front view of the first embodiment of the present invention.
Figure 7:
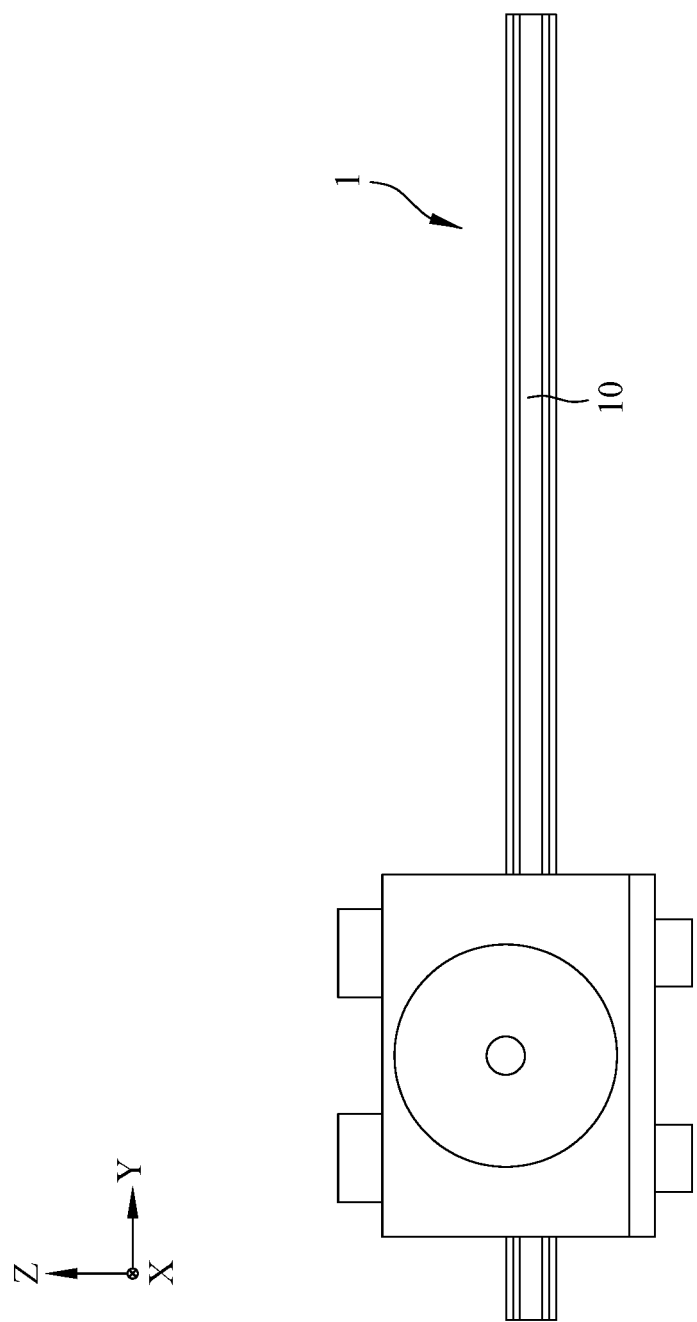
FIG. 7 is a left side view of the first embodiment of the present invention.

FIG. 5B shows a radiation field range 70 of the antenna 1 of the present invention, which represents the detection range of the antenna 1 of the present invention. The central portion thereof indicates a larger antenna radiation energy, and the peripheral portion thereof indicates a smaller antenna radiation energy. Because the radiating elements 42, 512, 522 form 45 degrees, they have polarization fields in the X-axis and Y-axis directions; that is, the radiation energies of the primary polarization and the secondary polarization is equivalent to each other. The antenna 1 of the present invention has a larger electromagnetic wave energy and a wider detection range on the XZ plane, and the radiation energy gradually decreases from the middle angle to the both sides. Therefore, the antenna 1 of the present invention can increase the beamwidth (that is, the positive gain range) and improve the detection range of the antenna 1 of the present invention.

The antenna 1 of the present invention is used to sense the distance and speed of an object after being installed on a sensor. The sensor may be a vehicle radar, so the antenna 1 of the present invention uses frequency-modulated continuous wave (FMCW) to detect the distance and speed of the object, and the operating frequency may be 24 GHz or 77 GHz or 79 GHz to support the frequency band of the vehicle radar.

Further, it is found through actual experiments in the present invention that if the first gap 61 is less than 1 mm, a part of the electromagnetic wave of the emitting end 40 will be transmitted from the first metal ground 20 across the first gap 61 to the second metal ground 30, and a part of the electromagnetic wave of the receiving module 50 is simultaneously transmitted from the second metal ground 30 across the first gap 61 to the first metal ground 20, thereby resulting in the electromagnetic waves between the emitting end 40 and the receiving module 50 interfering with each other. However, the mutual interference is still much improved compared with the second conventional antenna 200, and thus the purpose of improving the influence of surface waves can still be achieved. The accuracy of determining the direction of the object by the antenna 1 of the present invention is still better than that of the second conventional antenna 200.

When the width of the first gap 61 is equal to 1 mm, the electromagnetic wave of the emitting end 40 cannot be transmitted from the first metal ground 20 across the first gap 61 to the second metal ground 30, and the electromagnetic wave of the receiving module 50 cannot be transmitted from the second metal ground 30 across the first gap 61 to the first metal ground 20, which ensures that the electromagnetic waves between the emitting end 40 and the receiving module 50 will not interfere with each other at all and thus the purpose of improving the influence of surface waves can be achieved, thereby the accuracy of the antenna 1 of the present invention in determining the direction of the object is increased. In other embodiments, the width of the first gap 61 may be greater than 1 mm, which can also achieve the above-mentioned effect.

As shown in FIG. 5A, FIG. 8, FIG. 9, and FIG. 10, in the first embodiment of the present invention, the antenna 1 includes two first metal grounds 20, 201 and two emitting ends 40, 401, and the two adjacent first metal grounds 20, 201 are completely separated by a second gap 62, and the two emitting ends 40, 401 are respectively disposed on the two first metal grounds 20, 201. As shown in FIG. 10, the electromagnetic waves of the two emitting ends 40, 401 are confined within the two first metal grounds 20, 201, effectively reducing the electromagnetic waves across the second gap 62, and removing the mutual interference of the electromagnetic waves between the emitting ends 40, 401.

Figure 11:
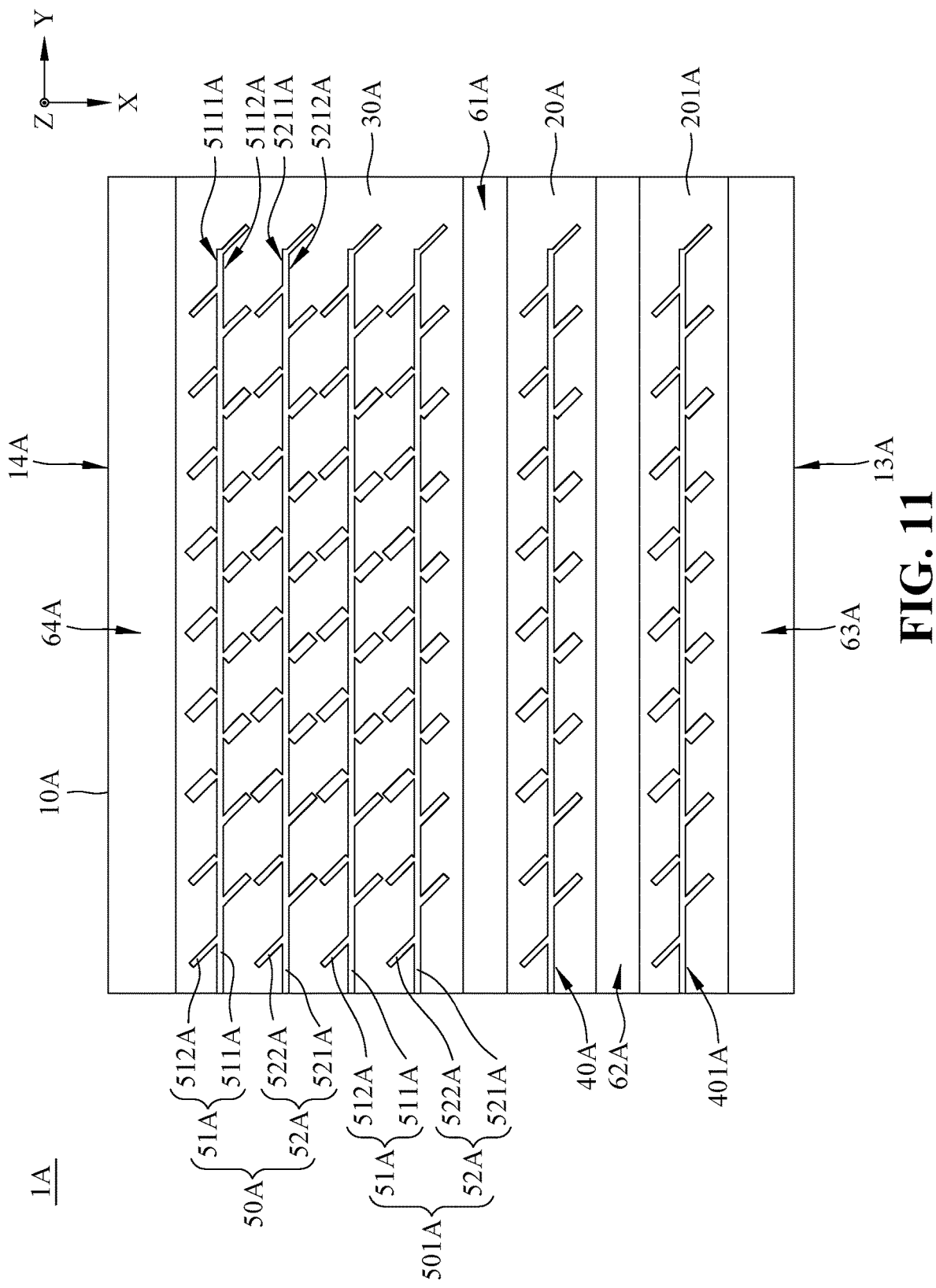
FIG. 11 is a top view of a second embodiment of the present invention.

Please refer to FIG. 11, which is a top view of a second embodiment of the present invention. In the second embodiment of the present invention, the antenna 1A includes two first metal grounds 20A, 201A and two emitting ends 40A, 401A, and the adjacent two first metal grounds 20A and 201A are completely separated by a second gap 62A. The two emitting ends 40A and 401A are respectively disposed on the two first metal grounds 20A and 201A. The electromagnetic waves of the two emitting ends 40A and 401A are confined within the two first metal grounds 20A and 201A, and thus the electromagnetic waves across the second gap 62A are effectively reduced, and the mutual interference of the electromagnetic waves between the emitting ends 40A and 401A is reduced.

Further, it is also found that if the second gap 62, 62A is less than 1 mm, a part of the electromagnetic wave of the emitting ends 40, 40A is still transmitted from the first metal ground 20, 20A across the second gap 62, 62A to other first metal grounds 201, 201A, thereby resulting in the mutual interference of the electromagnetic waves between the emitting ends 40, 401 or between the emitting ends 40A, 401A, but the mutual interference is still much improved compared with the second conventional antenna 200, and the influence of surface waves can still be improved. The accuracy of determining the direction of the object by the antennas 1 and 1A of the present invention is still better than that of the second conventional antenna 200.

It is found that when the width of the second gaps 62, 62A is equal to 1 mm, the electromagnetic waves of the emitting ends 40, 40A cannot be transmitted from the first metal ground 20, 20A across the second gaps 62, 62A to other first metal grounds 201, 201A at all, which ensures that the electromagnetic waves between the emitting ends 40, 401 or between the emitting ends 40A, 401A will not interfere with each other at all, so as to improve the influence of surface waves, thereby improving the accuracy of the antenna 1, 1A of the present invention in determining the direction of the object. In other embodiments, the width of the second gaps 62, 62A is greater than 1 mm, which can also achieve the above-mentioned effect.

Figure 8:
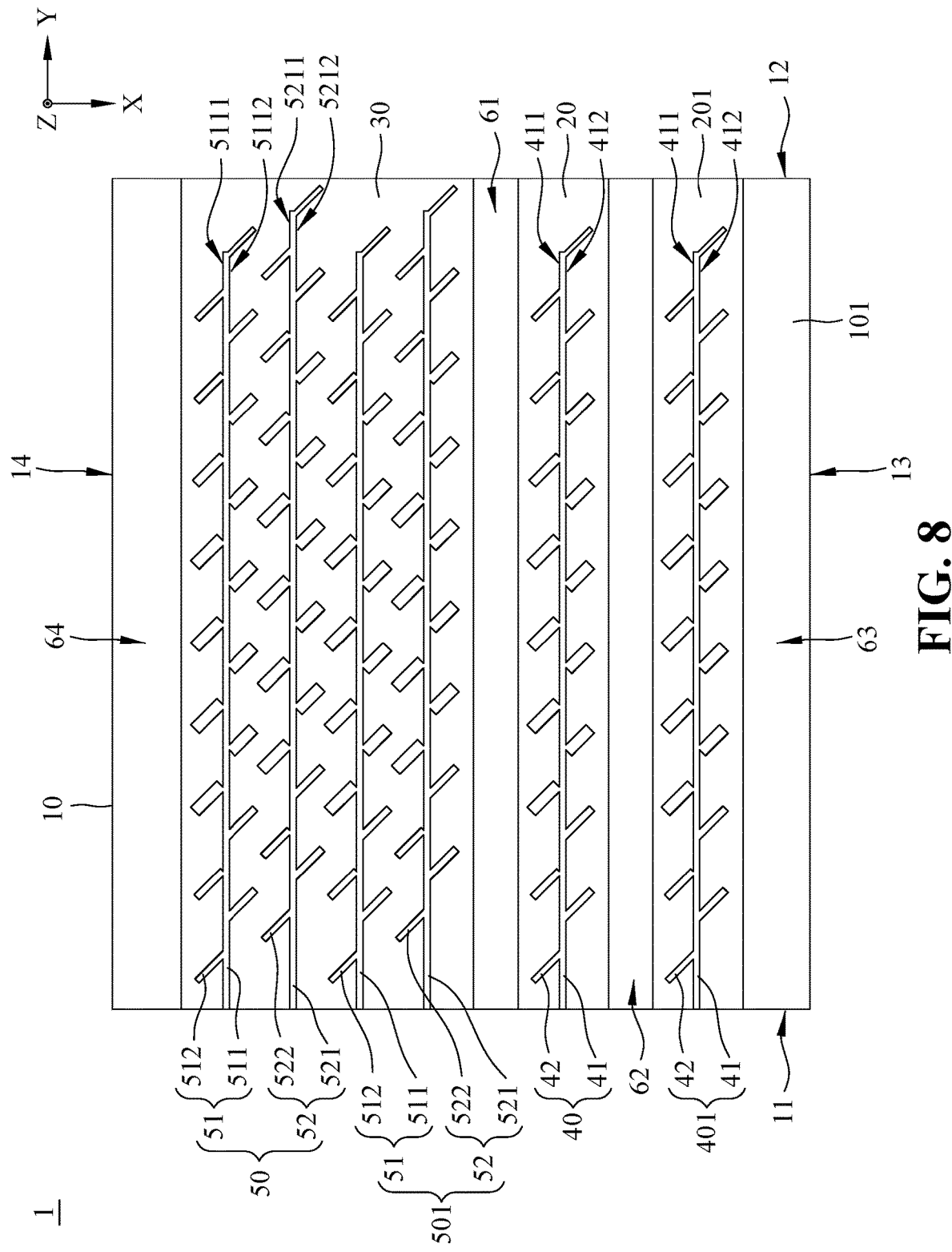
FIG. 8 is a top view of the first embodiment of the present invention.
Figure 9:
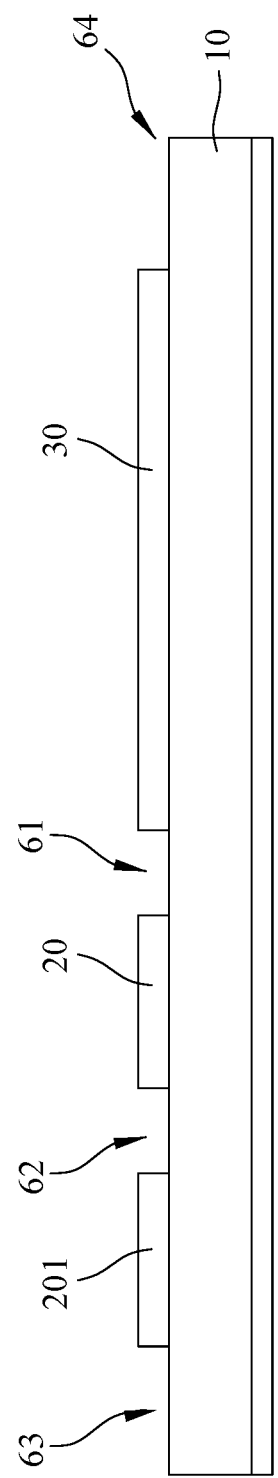
FIG. 9 is a right side view of the first embodiment of the present invention.

As shown in FIG. 5A, FIG. 8 and FIG. 9, in the first embodiment of the present invention, the antenna 1 includes two receiving modules 50, 501. The locations of the radiating elements 512 on the first side 5111 of transmission lines 511 of the first receiving end 51 of each of the receiving modules 50, 501 and the locations of the radiating elements 522 on the first side 5211 of transmission lines 521 of the second receiving end 52 of each of the receiving modules 50, 501 are staggered with each other. The locations of the radiating elements 512 on the second side 5112 of transmission lines 511 of the first receiving end 51 of each of the receiving modules 50, 501 and the locations of the radiating elements 522 on the second side 5212 of transmission lines 521 of the second receiving end 52 of each of the receiving modules 50, 501 are staggered with each other.

Accordingly, in the first embodiment of the present invention, a distance between the radiating elements 512 and the receiving modules 50, 501 of the second side 5112 of the transmission line 511 of the first receiving end 51 of each of the receiving modules 50, 501 and the radiating elements 522 of the first side 5211 of the transmission line 521 of the second receiving end 52 of each of the receiving modules 50, 501 is kept to be not too close along the Y-axis direction, the coupling effect is thus reduced, and the isolation between the first receiving end 51 and the second receiving end 52 of each of the receiving modules 50, 501 is improved to make the radiation field and the phase difference symmetrical and stable.

Further, in the first embodiment of the present invention, the locations of the radiating elements 512 on the first side 5111 of the transmission line 511 of the first receiving end 51 of the receiving modules 50, 501 are aligned with each other, the locations of the radiating elements 512 on the second side 5112 of the transmission line 511 of the first receiving end 51 of the receiving modules 50, 501 are aligned with each other, the locations of the radiating elements 522 on the first side 5211 of the transmission line 521 of the second receiving end 52 of the receiving modules 50, 501 are aligned with each other, and the locations of the radiating elements 522 on the second side 5212 of the transmission line 521 of the second receiving end 52 of the receiving modules 50, 501 are aligned with each other. In other words, the locations of the radiating elements 522 on the second side 5212 of the transmission line 521 of the second receiving end 52 of one of the receiving modules 50, 501 interleave with the locations of the radiating elements 512 on the first side 5111 of the transmission line 511 of the first receiving end 51 of the other of receiving modules 50, 501. Accordingly, a distance between the radiating elements 522 on the second side 5212 of the transmission line 521 of the second receiving end 52 of one of the receiving modules 50, 501 and the radiating elements 512 on the first side 5111 of the transmission line 511 of the first receiving end 51 of the other of the receiving modules 50, 501 is kept to be not too close along the Y-axis direction, the coupling effect is thus reduced, the isolation between the second receiving end 52 of one of the receiving modules 50, 501 and the second receiving end 52 of the other of the receiving modules 50, 501 is improved to make the radiation field and the phase difference symmetrical and stable.

As shown in FIG. 5A, FIG. 8 and FIG. 9, in the first embodiment of the present invention, a distance between the radiating elements 512 on the second side 5112 of transmission lines 511 of the first receiving end 51 of each of the receiving modules 50, 501 and the radiating elements 522 on the first side 5211 of transmission lines 521 of the second receiving end 52 of each of the receiving modules 50, 501 is equal to half wavelength along the Y-axis direction, wherein the radiating elements 522 on the second side 5212 of the transmission lines 521 of the second receiving end 52 of one of the receiving modules 50, 501 and the radiating elements 512 on the first side 5111 of the transmission lines 511 of the first receiving end 51 of the other of the receiving modules 50, 501 is equal to half wavelength along the Y-axis direction.

In other embodiments, a distance between the radiating elements 512 on the second side 5112 of transmission lines 511 of the first receiving end 51 of each of the receiving modules 50, 501 and the radiating elements 522 on the first side 5211 of transmission lines 521 of the second receiving end 52 of each of the receiving modules 50, 501 is larger than half wavelength, wherein a distance between the radiating elements 522 on the second side 5212 of transmission lines 521 of the second receiving end 52 of one of the receiving modules 50, 501 and the radiating elements 512 on the first side 5111 of transmission lines 511 of the first receiving end 51 of the other of the receiving modules 50, 501 is larger than half wavelength along the Y-axis direction.

As shown in FIG. 11, in the second embodiment of the present invention, the antenna 1A includes two receiving modules 50A, 501A. The locations of the radiating elements 512A on the first side 5111A of the transmission lines 511A of the first receiving end 51A of each of the receiving modules 50A, 501A align with the locations of the radiating elements 522A on the first side 5211A of the transmission lines 521A of the second receiving end 52A of each of the receiving modules 50A, 501A. The locations of the radiating elements 512A on the second side 5112A of the transmission lines 511A of the first receiving end 51A of each of the receiving modules 50A, 501A align with the locations of the radiating elements 522A on the second side 5212A of the transmission lines 521A of the second receiving end 52A of each of the receiving modules 50A, 501A. Accordingly, a distance between the radiating elements 512A on the second side 5112A of the transmission line 511A of the first receiving end 51A of each of the receiving modules 50A, 501A and the radiating elements 522A on the first side 5211A of the transmission line 521A of the second receiving end 52A of each of the receiving modules 50A, 501A is short along the Y-axis direction, the coupling effect is thus increased, the isolation between the first receiving end 51A and the second receiving end 52A of each of the receiving modules 50A, 501A is reduced to make the radiation field and the phase difference asymmetrical and unstable.

Further, the locations of the radiating elements 512A on the first side 5111A of transmission lines 511A of the first receiving end 51A of the receiving modules 50A, 501A align with the locations of the radiating elements 522A on the first side 5211A of the transmission lines 521A of the second receiving end 52A of the receiving modules 50A, 501A. The locations of the radiating elements 512A on the second side 5112A of transmission lines 511A of the first receiving end 51A of the receiving modules 50A, 501A align with the locations of the radiating elements 522A on the second side 5212A of transmission lines 521A of the second receiving end 52A of the receiving modules 50A, 501A. Accordingly, a distance between the radiating elements 522A on the second side 5212A of the transmission line 521A of the second receiving end 52A of one of the receiving modules 50A, 501A and the radiating elements 512A on the first side 5111A of the transmission line 511A of the first receiving end 51A of the other of the receiving modules 50A, 501A is short along the Y-axis direction, the coupling effect is thus increased, the isolation between the second receiving end 52A of one of the receiving modules 50A, 501A and the first receiving end 51A of the other of the receiving modules 50A, 501A is thus reduced to make the radiation field and the phase difference asymmetrical and unstable.

As shown in FIG. 5A, FIG. 8, FIG. 9 and FIG. 11, in the first and second embodiments of the present invention, the first metal grounds 20, 20A and the third sides 13, 13A of the substrates 10, 10A are completely separated by a third gaps 63, 63A, and the second metal ground and the fourth sides 14, 14A of the substrates 10, 10A are completely separated by a fourth gaps 64, 64A. After the antennas 1, 1A of the present invention is installed on the sensor, many electronic components surrounding the antennas 1, 1A will only touch the third sides 13, 13A and the fourth sides 14, 14A of the substrate 10, and the sides of the first metal grounds 20, 20A and the second metal grounds 30, 30A, which are closest to the third sides 13, 13A of the substrates 10, 10A, will not be contacted. In such a way, the electromagnetic waves of the electronic components will not enter the first metal grounds 20, 20A and the second metal grounds 30, 30A, which is closest to the third side 13, 13A of the substrates 10, 10A, and the electromagnetic waves of the emitting ends 40, 40A of the first metal grounds 20, 20A disposed closest to the third sides 13, 13A of the substrates 10, 10A cannot be transmitted to these electronic components. Also, the electromagnetic waves of the receiving modules 50, 501, 50A, 501A cannot be transmitted to the electronic components. The electromagnetic waves of the emitting ends 40, 40A of the first metal grounds 20, 20A disposed closest to the third sides 13, 13A of the substrates 10, 10A, the electromagnetic waves of the receiving modules 50, 501, 50A, 501A, and the electromagnetic waves of the electronic components will not interfere with each other at all, and thus the edge effect is avoided.

Figure 12A:
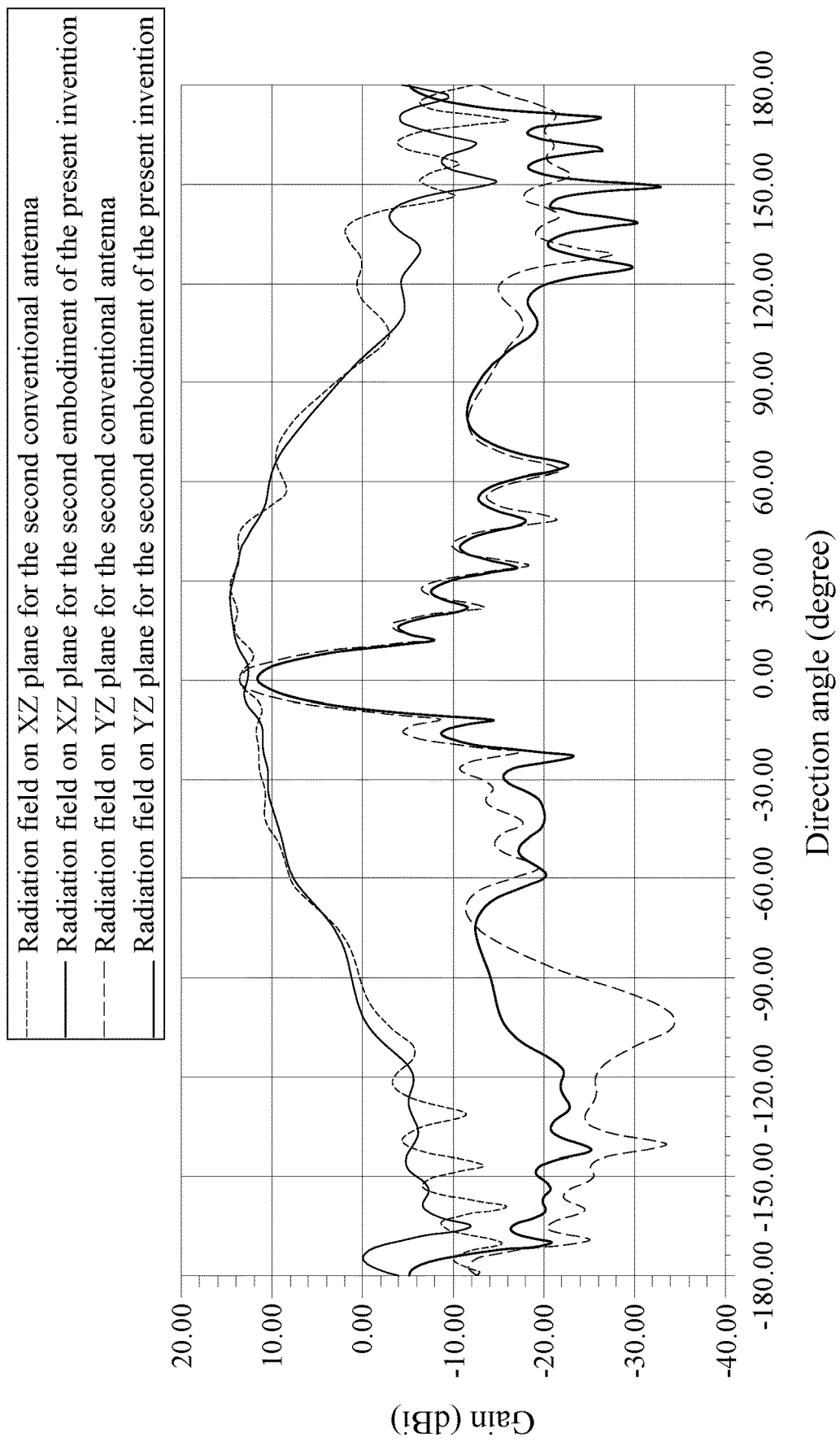
FIG. 12A is a comparison diagram of the radiation field of the second embodiment of the present invention and the second conventional antenna.

Please refer to FIG. 12A, which is a comparison diagram of the radiation field of the second embodiment of the present invention and the second conventional antenna 200. The X-axis is the angle of the direction angle, the unit of which is "degree"; the Y-axis is the gain, the unit of which is "dBi"; and the operating frequency thereof is 77 GHz. In the range of the direction angle from negative 60 degrees to positive 60 degrees, the jitter of the radiation field on the XZ plane for the second conventional antenna 200 is quite obvious, which represents that the electromagnetic wave will unstably vary large and small. In the range of the direction angle from negative 60 degrees to positive 60 degrees, the jitter of the radiation field on the XZ plane for the second embodiment of the present invention is less, which represents that the electromagnetic wave will be more stable without variation.

Figure 12B:
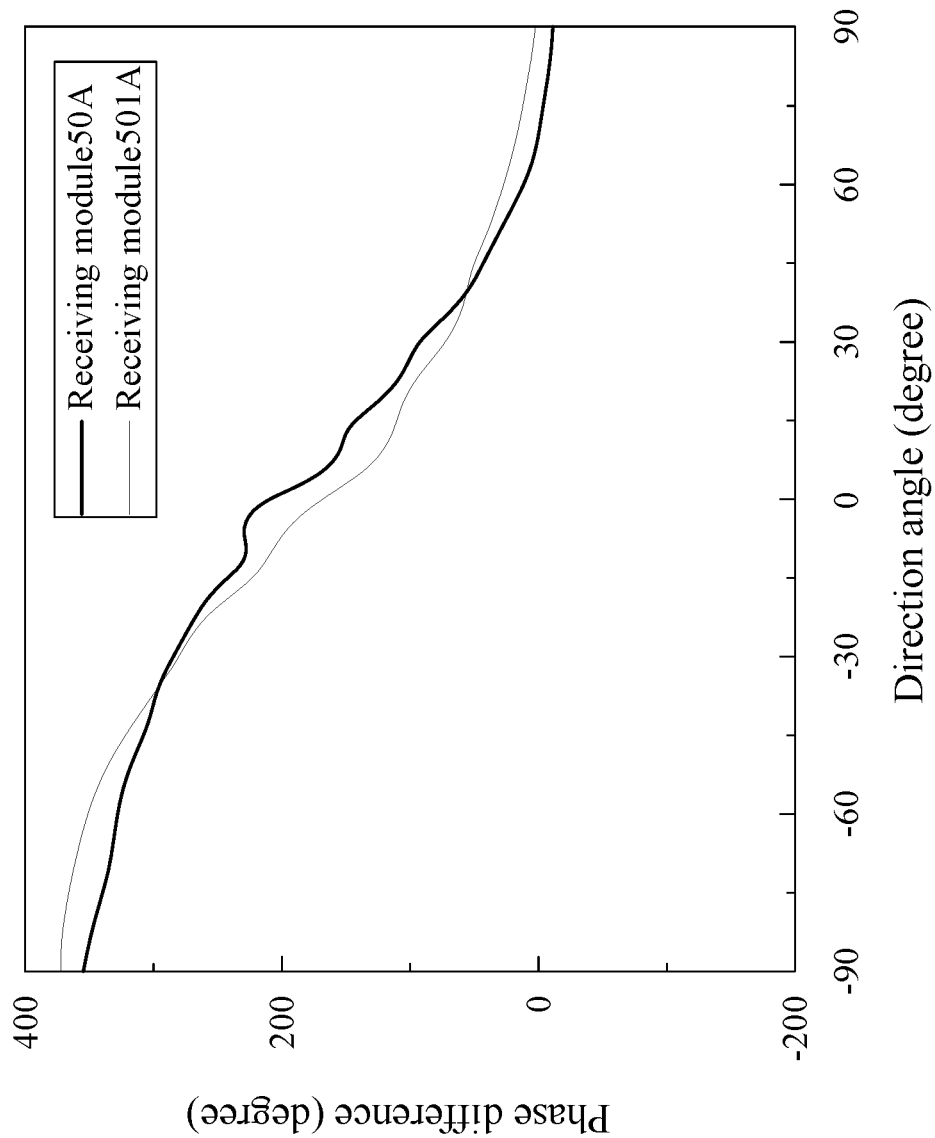
FIG. 12B is a schematic diagram of the phase difference of the two receiving modules according to the second embodiment of the present invention.

Please refer to FIG. 12B, which is a schematic diagram of the phase difference of the two receiving modules 50A, 501A according to the second embodiment of the present invention. In the range of the direction angle from negative 15 degrees to positive 60 degrees, the phase difference of the two receiving modules 50A, 501A of the second embodiment of the present invention has an obvious jitter in the range of the directional angle from negative 15 degrees to 0 degree, which indicates that there are still repeated corresponding phase differences, but has no obvious jitter in the range of the direction angle from 0 degree to positive 60 degrees, approaching to a linear increasing or decreasing line segment, which indicates that the phase difference is much improved compared with that of the second conventional antenna 200. Therefore, it is easier in determining the direction of the object for the second embodiment of the present invention than the second conventional antenna 200.

As shown in FIG. 12A, the range of the direction angle which has the positive gain of the radiation field of the second conventional antenna 200 is approximately from negative 90 degree to positive 96 degree, and thus the direction angle covers approximately 186 degrees. The range of the direction angle which has the positive gain of the radiation field on the XZ plane for the second embodiment of the present invention is approximately from negative 102 degree to positive 97 degree, and thus the direction angle covers approximately 199 degrees. It can be seen that the beamwidth of the radiation field (i.e., the range of the positive gain) on the XZ plane for the second embodiment of the present invention is larger than the beamwidth of the radiation field (i.e., the range of the positive gain) for the second conventional antenna 200, which indicates that the detection range of the second embodiment of the present invention is larger than that of the second conventional antenna 200.

Figure 13A:
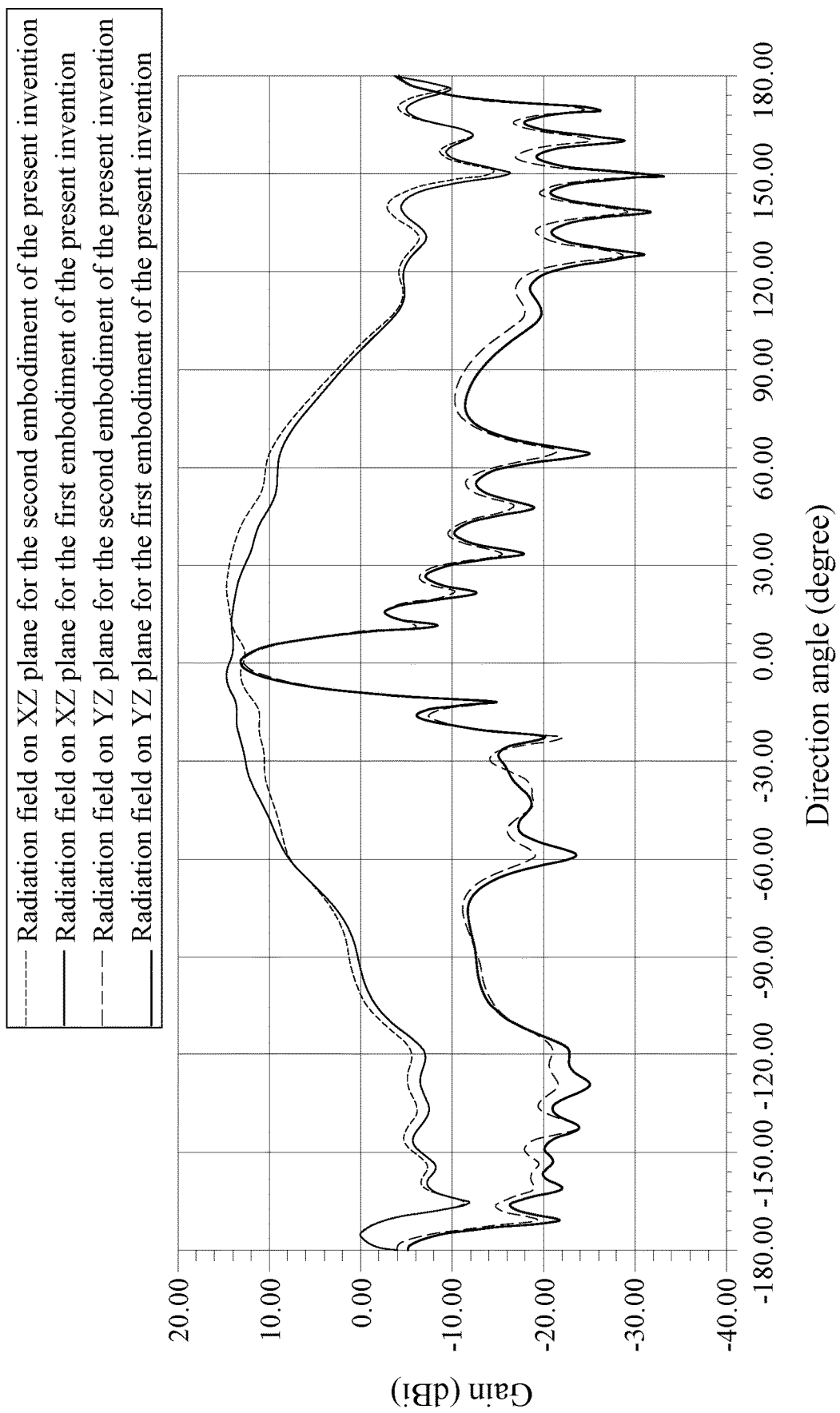
FIG. 13A is a comparison diagram of radiation field of the first embodiment and the second embodiment of the present invention.

Please refer to FIG. 13A, which is a comparison diagram of the radiation fields of the first embodiment and the second embodiment of the present invention. The X-axis is the angle of the direction angle, the unit of which is "degree"; the Y-axis is the gain, the unit of which is "dBi"; and the operating frequency thereof is 77 GHz. When the direction angle is 0 degree, it represents the intensity of the electromagnetic wave emitted by the radiating element in the middle of the first receiving end and the second receiving end of the receiving module and the emitting end of the antenna. Based on 0 degree as a reference, the radiation field of the second embodiment of the present invention is obviously asymmetric, which results from that the radiating elements 521A, 522A of the second embodiment of the present invention are aligned with each other, so the coupling effect is stronger, and the radiation field and the phase difference are both asymmetric and unstable. In contrast, the radiation field of the first embodiment of the present invention is more symmetric, which results from that the radiating elements 521, 522 of the first embodiment of the present invention are staggered with each other, so the coupling effect is weaker, and the radiation pattern and phase difference are symmetric and stable.

Figure 13B:
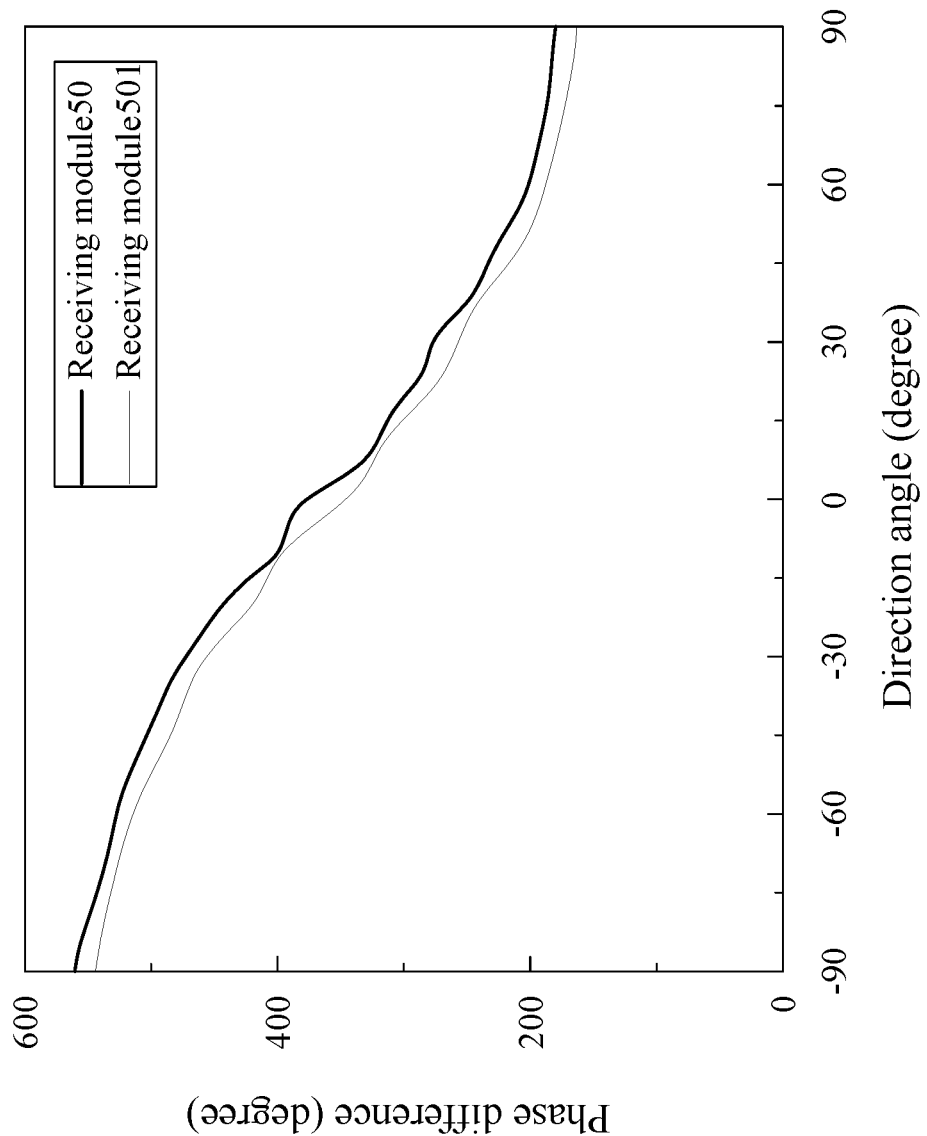
FIG. 13B is a schematic diagram of the phase difference of the two receiving modules according to the first embodiment of the present invention.

Please refer to FIG. 13B, which is a schematic diagram of the phase difference between the two receiving modules 50, 501 of the first embodiment of the present invention. No obvious jitter is present in the range of the direction angle from negative 15 degrees to positive 60 degrees for the first embodiment of the present invention, approaching to a linear increasing or decreasing line segment, which indicates that the phase difference is much improved compared to the second embodiment of the present invention. Therefore, it is easier in determining the direction of the object in the first embodiment of the present invention than the second embodiment of the present invention.

Furthermore, the maximum gain (Max gain) (dBi), the half power point (Max-3 dB angle) (degree) and the positive gain range (0 dBi) (degree) of the first embodiment of the present invention and the first conventional antenna 100 are compared. The comparison results of the maximum gain are shown in Table 1, the comparison results of the half power point are shown in Table 2, and the comparison results of the positive gain range are shown in Table 3. Tables 2 and 3 list the half power point and the positive gain range of the first embodiment of the present invention. The radiation field range 70 of the antenna 1 of the present invention shown in FIG. 5A, FIG. 6, and FIG. 7, and the curve of the radiation field of the antenna 1 of the present invention shown in FIG. 13A are referred to for better understanding.

TABLE 1

| First conventional antenna | Max gain | First embodiment of the present invention | Max gain |
|---|---|---|---|
| Emitting end 120 | 14.7 | Emitting end 40 | 15 |
| Emitting end 130 | 14.7 | Emitting end 401 | 15 |
| The first receiving end 141 of the receiving module 140 | 14.1 | The first receiving end 51 of the receiving module 50 | 14.7 |
| The second receiving end 142 of the receiving module 140 | 13.7 | The second receiving end 52 of the receiving module 50 | 13.8 |
| The first receiving end 151 of the receiving module 150 | 13.8 | The first receiving end 51 of the receiving module 501 | 14.1 |
| The second receiving end 152 of the receiving module 150 | 14.4 | The second receiving end 52 of the receiving module 501 | 14.5 |

TABLE 2

| First conventional antenna | Half power point | | First embodiment of the present invention | Half power point | |
|---|---|---|---|---|---|
| Emitting end 120 | −34 | +32 | Emitting end 40 | −37 | +35 |
| Emitting end 130 | −32 | +35 | Emitting end 401 | −32 | +37 |
| The first receiving end 141 of the receiving module 140 | −39 | +37 | The first receiving end 51 of the receiving module 50 | −39 | +38 |
| The second receiving end 142 of the receiving module 140 | −46 | +41 | The second receiving end 52 of the receiving module 50 | −48 | +47 |
| The first receiving end 151 of the receiving module 150 | −47 | +41 | The first receiving end 51 of the receiving module 501 | −46 | +46 |
| The second receiving end 152 of the receiving module 150 | −36 | +32 | The second receiving end 52 of the receiving module 501 | −34 | +43 |

TABLE 3

| First conventional antenna | Range of positive gain | | First embodiment of the present invention | Range of positive gain | |
| --- | --- | --- | --- | --- | --- |
| Emitting end 120 | −76 | +82 | Emitting end 40 | −87 | +97 |
| Emitting end 130 | −74 | +85 | Emitting end 401 | −88 | +102 |
| The first receiving end 141 of the receiving module 140 | −86 | +75 | The first receiving end 51 of the receiving module 50 | −93 | +96 |
| The second receiving end 142 of the receiving module 140 | −86 | +76 | The second receiving end 52 of the receiving module 50 | −88 | +98 |
| The first receiving end 151 of the receiving module 150 | −84 | +78 | The first receiving end 51 of the receiving module 501 | −92 | +97 |
| The second receiving end 152 of the receiving module 150 | −80 | +78 | The second receiving end 52 of the receiving module 501 | −90 | +98 |

It can be clearly seen from Table 1 that the maximum gains of the two emitting ends 40, 401 and the first receiving end 51 and the second receiving end 52 of the two receiving modules 50, 501 of the first embodiment of the present invention are slightly larger than the maximum gain of the two emitting ends 120, 130 and the first receiving ends 141, 151 and the second receiving ends 142, 152 of the two receiving modules 140, 150 of the first conventional antenna 100.

It can be clearly seen from Table 2 that the half power point of one emitting end 40 of the first embodiment of the present invention is 72 degrees in total; the half power point of one emitting end 120 of the first conventional antenna 100 is 66 degrees in total, which is smaller than the half power point of one emitting end 40 of the first embodiment of the present invention by about 6 degrees. The half power point of the other emitting end 40 of the first embodiment of the present invention is 69 degrees in total; the half power point of the other emitting end 130 of the first conventional antenna 100 is 67 degrees in total, which is smaller than the half power point of the other emitting end 40 of the first embodiment of the present invention by about 2 degrees. The half power point of the first receiving end 51 of one receiving module 50 of the first embodiment of the present invention is 77 degrees in total; the half power point of the first receiving end 141 of one receiving module 140 of the first conventional antenna 100 is 76 degrees in total, which is smaller than the half power point of the first receiving end 51 of one receiving module 50 of the first embodiment of the present invention by about 1 degree. The half power point of the second receiving end 52 of one receiving module 50 of the first embodiment of the present invention is 95 degrees in total; the half power point of the second receiving end 142 of one receiving module 140 of the first conventional antenna 100 is 87 degrees in total, which is smaller than the half power point of the second receiving end 52 of one receiving module 50 of the first embodiment of the present invention by about 8 degrees. The half power point of the first receiving end 51 of the other receiving module 501 of the first embodiment of the present invention is 92 degrees in total; the half power point of the first receiving end 151 of the other receiving module 150 of the first conventional antenna 100 is 88 degrees in total, which is smaller than the half power point of the first receiving end 51 of the other receiving module 501 of the first embodiment of the present invention by about 4 degrees. The half power point of the second receiving end 52 of another receiving module 501 of the first embodiment of the present invention is 77 degrees in total; the half power point of the second receiving end 152 of the other receiving module 150 of the first conventional antenna 100 is 68 degrees in total, which is smaller than the half power point of the second receiving end 52 of the other receiving module 501 of the first embodiment of the present invention by about 9 degrees. When the half power point is higher, the electromagnetic wave energy is larger and the detection range is wider, and the half power point is wider, thus the detection range of the first embodiment of the present invention is wider than that of the first conventional antenna 100.

It can be clearly seen from Table 3, the range of the direction angle which has the positive gain for one emitting end 40 of the first embodiment of the present invention totally covers 184 degrees; the range of the direction angle which has the positive gain for one emitting end 120 of the first conventional antenna 100 totally covers 158 degrees, which is smaller than the positive gain range of one emitting end 40 of the first embodiment of the present invention by about 26 degrees. The positive gain range of the other emitting end 40 of the first embodiment of the present invention covers 190 degrees in total; the positive gain range of the other emitting end 130 of the first conventional antenna 100 covers 159 degrees in total, which is smaller than the positive gain range of the other emitting end 40 of the first embodiment of the present invention by about 31 degrees. The positive gain range of the first receiving end 51 of one receiving module 50 of the first embodiment of the present invention covers 189 degrees in total; the positive gain range of the first receiving end 141 of one receiving module 140 of the first conventional antenna 100 covers 161 degrees in total, which is smaller than the positive gain range of the first receiving end 51 of one receiving module 50 of the first embodiment of the present invention by about 28 degrees. The positive gain range of the second receiving end 52 of one receiving module 50 of the first embodiment of the present invention covers 186 degrees in total; the positive gain range of the second receiving end 142 of one receiving module 140 of the first conventional antenna 100 covers 162 degrees in total, which is smaller than the positive gain range of the second receiving end 52 of one receiving module 50 of the first embodiment of the present invention by about 24 degrees. The positive gain range of the first receiving end 51 of the other receiving module 501 of the first embodiment of the present invention covers 189 degrees in total; the positive gain range of the first receiving end 151 of the other receiving module 150 of the first conventional antenna 100 covers 162 degrees in total, which is smaller than the positive gain range of the first receiving end 51 of the other receiving module 501 of the first embodiment of the present invention by about 27 degrees. The positive gain range of the second receiving end 52 of the other receiving module 501 of the first embodiment of the present invention covers 188 degrees in total; the positive gain range of the second receiving end 152 of the other receiving module 150 of the first conventional antenna 100 covers 158 degrees in total, which is smaller than the positive gain range of the second receiving end 52 of the other receiving module 501 by about 30 degrees. When the beamwidth (i.e., the positive gain range) is wider, the electromagnetic wave energy is larger and the detection range is wider.

In summary, the first metal grounds 20, 20A, and the second metal grounds 30, 30A of the antennas 1, 1A of the present invention are completely separated by the first gaps 61, 61A, which effectively decreases the electronic wave across the first gaps 61, 61A to solve mutual interference of the electromagnetic waves between the emitting ends 40, 40A and the receiving modules 50, 501, 50A, 501A and achieve the purpose of improving influence of surface waves, thereby improving the accuracy in determining the direction of object by the antennas 1, 1A of the present invention.

Secondly, the adjacent two first metal grounds 20, 201, 20A, 201A of the antennas 1, 1A of the present invention are completely separated by the second gaps 62, 62A, which effectively decreases the electromagnetic wave across the second gaps 62, 62A to solve mutual interference of the electromagnetic waves between the emitting ends 40, 401 or the emitting ends 40A, 401A and achieve the purpose of improving influence of surface waves, thereby improving the accuracy in determining the direction of object by the antennas 1, 1A of the present invention.

Furthermore, the polarization direction (i.e., the current direction) of the antennas 1, 1A of the present invention has both the X-axis direction component and the Y-axis direction component, so the radiation fields on the XZ plane and the YZ plane are generated, the beamwidth (i.e., the positive gain range) may be increased and the detection range of the antennas 1, 1A of the present invention is further increased.

Besides, the antennas 1, 1A of the present invention can reduce the coupling effect of these radiating elements at the adjacent two receiving ends, improve the isolation between the adjacent two receiving ends, and make the radiation field pattern and the phase difference symmetrical and stable.

Moreover, the antennas 1, 1A of the present invention may make no electromagnetic wave interference between the electronic elements and the emitting ends 40, 401, 40A, 401A and the receiving modules 50, 501, 50A, 501A and thus the edge effect is prevented.

The above are only for explaining the preferred embodiments of the present invention, and are not intended to limit the present invention in any form. Therefore, any modification or variation related to the present invention made under the same spirit of the invention should still be included in the scope of the present invention.

What is claimed is:

1. An antenna for improving an influence of surface waves and increasing a beamwidth, comprising:
    a substrate having two surfaces along a Z-axis direction, which are defined as a first surface and a second surface, respectively, the substrate having two sides along a Y-axis direction, which are defined as a first side and a second side, respectively, the substrate having two sides along an X-axis direction, which are defined as a third side and a fourth side, respectively;
    at least one first metal ground disposed on the first surface of the substrate;
    a second metal ground disposed on the first surface of the substrate, and located on a side of the at least one first metal ground along the X-axis direction, wherein the second metal ground is completely separated from the at least one first metal ground by a first gap;
    at least one emitting end disposed on the at least one first metal ground, and including a transmission line and a plurality of radiating elements, wherein the transmission line of the at least one emitting end extends along the Y-axis direction, the radiating elements of the at least one emitting end are in a strip shape and disposed at intervals on a first side and a second side of the transmission line of the at least one emitting end along the Y-axis direction; and
    at least one receiving module disposed on the second metal ground and including a first receiving end and a second receiving end, wherein the first receiving end includes a transmission line and a plurality of radiating elements, and the transmission line of the first receiving end extends along the Y-axis direction, the radiating elements of the first receiving end are in a strip shape and disposed at intervals on a first side and a second side of the transmission line of the first receiving end along the Y-axis direction, and the second receiving end is located on a side of the first receiving end along the X-axis direction, the second receiving end includes a transmission line and a plurality of radiating elements, the transmission line of the second receiving end extends along the Y-axis direction, the radiating elements of the second receiving end are in a strip shape and disposed at intervals on a first side and a second side of the transmission line of the second receiving end along the Y-axis direction;
    wherein locations of the radiating elements on the first side of the transmission line of the first receiving end are interleaved with locations of the radiating elements on the first side of the transmission line of the second receiving end, locations of the radiating elements on the second side of the transmission line of the first receiving end are interleaved with locations of the radiating elements on the second side of the transmission line of the second receiving end.

2. The antenna as claimed in claim 1, wherein the at least one first metal ground comprises a plurality of first metal grounds, the at least one emitting end comprises a plurality of emitting ends, adjacent two first metal grounds are completely separated by a second gap, and the emitting ends are respectively disposed on the first metal grounds.

3. The antenna as claimed in claim 2, wherein a width of the second gap is larger than or equal to 1 mm.

4. The antenna as claimed in claim 1, wherein the at least one receiving module comprises a plurality of receiving modules, the locations of the radiating elements on the first side of the transmission line of the first receiving end of the receiving modules are aligned with each other, the locations of the radiating elements on the second side of the transmission line of the first receiving end of the receiving modules are aligned with each other, the locations of the radiating elements on the first side of the transmission line of the second receiving end of the receiving modules are aligned with each other, and the locations of the radiating elements on the second side of the transmission line of the second receiving end of the receiving modules are aligned with each other.

5. The antenna as claimed in claim 1, wherein a width of the first gap is larger than or equal to 1 mm.

6. The antenna as claimed in claim 1, wherein the at least one first metal ground is completely separated from the third side of the substrate by a gap.

7. The antenna as claimed in claim 1, wherein the second metal ground is completely separated from the fourth side of the substrate by a gap.

8. An antenna for improving an influence of surface waves and increasing a beamwidth, comprising:
- a substrate having two surfaces along a Z-axis direction, which are defined as a first surface and a second surface, respectively, the substrate having two sides along a Y-axis direction, which are defined as a first side and a second side, respectively, the substrate having two sides along an X-axis direction, which are defined as a third side and a fourth side, respectively;
- at least one first metal ground disposed on the first surface of the substrate;
- a second metal ground disposed on the first surface of the substrate, and located on a side of the at least one first metal ground along the X-axis direction, wherein the second metal ground is completely separated from the at least one first metal ground by a first gap;
- at least one emitting end disposed on the at least one first metal ground, and including a transmission line and a plurality of radiating elements, wherein the transmission line of the at least one emitting end extends along the Y-axis direction, the radiating elements of the at least one emitting end are in a strip shape and disposed at intervals on a first side and a second side of the transmission line of the at least one emitting end along the Y-axis direction; and
- at least one receiving module disposed on the second metal ground and including a first receiving end and a second receiving end, wherein the first receiving end includes a transmission line and a plurality of radiating elements, and the transmission line of the first receiving end extends along the Y-axis direction, the radiating elements of the first receiving end are in a strip shape and disposed at intervals on a first side and a second side of the transmission line of the first receiving end along the Y-axis direction, and the second receiving end is located on a side of the first receiving end along the X-axis direction, the second receiving end includes a transmission line and a plurality of radiating elements, the transmission line of the second receiving end extends along the Y-axis direction, the radiating elements of the second receiving end are in a strip shape and disposed at intervals on a first side and a second side of the transmission line of the second receiving end along the Y-axis direction;
- wherein the at least one first metal ground is completely separated from the third side of the substrate by a gap.

9. The antenna as claimed in claim 8, wherein the at least one receiving module comprises a plurality of receiving modules, locations of the radiating elements on the first side of the transmission line of the first receiving end of the receiving modules are aligned with each other, locations of the radiating elements on the second side of the transmission line of the first receiving end of the receiving modules are aligned with each other, locations of the radiating elements on the first side of the transmission line of the second receiving end of the receiving modules are aligned with each other, and locations of the radiating elements on the second side of the transmission line of the second receiving end of the receiving modules are aligned with each other.

10. The antenna as claimed in claim 8, wherein locations of the radiating elements on the first side of the transmission line of the first receiving end are aligned with locations of the radiating elements on the first side of the transmission line of the second receiving end; and wherein locations of the radiating elements on the second side of the transmission line of the first receiving end are aligned with locations of the radiating elements on the second side of the transmission line of the second receiving end.

11. The antenna as claimed in claim 10, wherein the at least one receiving module comprises a plurality of receiving modules, the locations of the radiating elements on the first side of the transmission line of the first receiving end of the receiving modules are aligned with the locations of the radiating elements on the first side of the transmission line of the second receiving end of the receiving modules, and the locations of the radiating elements on the second side of the transmission line of the first receiving end of the receiving modules are aligned with the locations of the radiating elements on the second side of the transmission line of the second receiving end of the receiving modules.

12. The antenna as claimed in claim 8, wherein a width of the first gap is larger than or equal to 1 mm.

13. An antenna for improving an influence of surface waves and increasing a beamwidth, comprising:
- a substrate having two surfaces along a Z-axis direction, which are defined as a first surface and a second surface, respectively, the substrate having two sides along a Y-axis direction, which are defined as a first side and a second side, respectively, the substrate having two sides along an X-axis direction, which are defined as a third side and a fourth side, respectively;
- at least one first metal ground disposed on the first surface of the substrate;
- a second metal ground disposed on the first surface of the substrate, and located on a side of the at least one first metal ground along the X-axis direction, wherein the second metal ground is completely separated from the at least one first metal ground by a first gap;
- at least one emitting end disposed on the at least one first metal ground, and including a transmission line and a plurality of radiating elements, wherein the transmission line of the at least one emitting end extends along the Y-axis direction, the radiating elements of the at least one emitting end are in a strip shape and disposed at intervals on a first side and a second side of the transmission line of the at least one emitting end along the Y-axis direction; and
- at least one receiving module disposed on the second metal ground and including a first receiving end and a second receiving end, wherein the first receiving end includes a transmission line and a plurality of radiating elements, and the transmission line of the first receiving end extends along the Y-axis direction, the radiating elements of the first receiving end are in a strip shape and disposed at intervals on a first side and a second side of the transmission line of the first receiving end along the Y-axis direction, and the second receiving end is located on a side of the first receiving end along the X-axis direction, the second receiving end includes a transmission line and a plurality of radiating elements, the transmission line of the second receiving end extends along the Y-axis direction, the radiating elements of the second receiving end are in a strip shape and disposed at intervals on a first side and a second side of the transmission line of the second receiving end along the Y-axis direction;
- wherein the second metal ground is completely separated from the fourth side of the substrate by a gap.

14. The antenna as claimed in claim 13, wherein the at least one receiving module comprises a plurality of receiving modules, locations of the radiating elements on the first side of the transmission line of the first receiving end of the receiving modules are aligned with each other, locations of the radiating elements on the second side of the transmission line of the first receiving end of the receiving modules are aligned with each other, locations of the radiating elements on the first side of the transmission line of the second receiving end of the receiving modules are aligned with each other, and locations of the radiating elements on the second side of the transmission line of the second receiving end of the receiving modules are aligned with each other.

15. The antenna as claimed in claim 13, wherein locations of the radiating elements on the first side of the transmission line of the first receiving end are aligned with locations of the radiating elements on the first side of the transmission line of the second receiving end; and wherein locations of the radiating elements on the second side of the transmission line of the first receiving end are aligned with locations of the radiating elements on the second side of the transmission line of the second receiving end.

16. The antenna as claimed in claim 15, wherein the at least one receiving module comprises a plurality of receiving modules, the locations of the radiating elements on the first side of the transmission line of the first receiving end of the receiving modules are aligned with the locations of the radiating elements on the first side of the transmission line of the second receiving end of the receiving modules, and the locations of the radiating elements on the second side of the transmission line of the first receiving end of the receiving modules are aligned with the locations of the radiating elements on the second side of the transmission line of the second receiving end of the receiving modules.

17. The antenna as claimed in claim 13, wherein a width of the first gap is larger than or equal to 1 mm.

\* \* \* \* \*